US012352176B1

(12) United States Patent
Freeman et al.

(10) Patent No.: US 12,352,176 B1
(45) Date of Patent: Jul. 8, 2025

(54) TURBINE SHROUD ASSEMBLIES WITH CHANNELS FOR BUFFER CAVITY SEAL THERMAL MANAGEMENT

(71) Applicant: Rolls-Royce Corporation, Indianapolis, IN (US)

(72) Inventors: Ted J. Freeman, Indianapolis, IN (US); Aaron D. Sippel, Indianapolis, IN (US); David J. Thomas, Indianapolis, IN (US); Clark J. Snyder, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/680,562

(22) Filed: May 31, 2024

(51) Int. Cl.
*F01D 11/08* (2006.01)
*F01D 11/00* (2006.01)
*F01D 11/04* (2006.01)

(52) U.S. Cl.
CPC ............ *F01D 11/04* (2013.01); *F01D 11/005* (2013.01); *F05D 2230/60* (2013.01); *F05D 2240/11* (2013.01); *F05D 2240/55* (2013.01)

(58) Field of Classification Search
CPC ...... F01D 11/005; F01D 11/08; F01D 25/246; F05D 2240/11
See application file for complete search history.

(56) References Cited

U.S. PATENT DOCUMENTS 7,207,771 B2 4/2007 Synnott et al.
7,217,089 B2 5/2007 Durocher et al.
7,374,395 B2 5/2008 Durocher et al.
7,513,740 B1 4/2009 Hervy et al.
7,600,967 B2 10/2009 Pezzetti, Jr. et al.
7,771,159 B2 8/2010 Johnson et al.
7,901,186 B2 3/2011 Cornett et al.
8,206,087 B2 6/2012 Campbell et al.
8,303,245 B2 11/2012 Foster et al.
8,641,371 B2 2/2014 Nakamura et al.
8,651,497 B2 2/2014 Tholen et al.
8,684,680 B2 4/2014 Martin et al.
8,784,041 B2 7/2014 Durocher et al.
8,845,285 B2 9/2014 Weber et al.
8,905,708 B2 12/2014 Weber et al.
9,079,245 B2 7/2015 Durocher et al.
9,534,500 B2 1/2017 Bouchard et al.
9,708,922 B1 7/2017 Davis et al.
9,714,580 B2 7/2017 Slavens et al.
9,745,854 B2 8/2017 Baldiga et al.
(Continued)

FOREIGN PATENT DOCUMENTS

EP 1965031 A2 9/2008
EP 3543468 A1 9/2019
FR 3056636 A1 3/2018

*Primary Examiner* — Justin D Seabe
(74) *Attorney, Agent, or Firm* — Barnes & Thorburg

(57) ABSTRACT

A turbine shroud assembly adapted for use with a gas turbine engine includes a carrier segment, a blade track segment, and a seal system. The carrier segment arranged circumferentially at least partway around an axis. The blade track segment is coupled to the carrier segment and defines a portion of a gas path of the gas turbine engine. The seal system includes seals arranged radially between the carrier segment and the blade track segment to block gases from flowing between the carrier segment and the blade track segment.

20 Claims, 14 Drawing Sheets

(56) References Cited

U.S. PATENT DOCUMENTS 9,759,079 B2 9/2017 Sippel et al.
9,863,265 B2 1/2018 Stapleton
9,863,323 B2 1/2018 Kirtley et al.
9,869,201 B2 1/2018 Dyson et al.
9,874,104 B2 1/2018 Shapiro
9,915,162 B2 3/2018 Duguay
9,945,484 B2 4/2018 Moehrle et al.
9,957,827 B2 5/2018 Davis et al.
9,982,550 B2 5/2018 Davis
9,988,919 B2 6/2018 Davis et al.
9,988,923 B2 6/2018 Snyder et al.
10,012,099 B2 7/2018 Cetel et al.
10,024,193 B2 7/2018 Shapiro
10,072,517 B2 9/2018 Boeke et al.
10,082,085 B2 9/2018 Thomas et al.
10,087,771 B2 10/2018 Mcgarrah
10,100,660 B2 10/2018 Sippel et al.
10,132,197 B2 11/2018 Heitman et al.
10,138,747 B2 11/2018 Dev et al.
10,138,750 B2 11/2018 Mccaffrey et al.
10,167,957 B2 1/2019 Davis et al.
10,202,863 B2 2/2019 Davis et al.
10,240,476 B2 * 3/2019 Varney .................. F01D 11/005
10,265,806 B2 4/2019 Cui et al.
10,281,045 B2 5/2019 Sippel et al.
10,301,955 B2 5/2019 Vetters et al.
10,301,960 B2 5/2019 Stapleton et al.
10,378,385 B2 8/2019 Tesson et al.
10,378,386 B2 8/2019 Roussille et al.
10,415,426 B2 9/2019 Quennehen et al.
10,415,427 B2 9/2019 Quennehen et al.
10,422,241 B2 9/2019 Mccaffrey et al.
10,428,688 B2 10/2019 Quennehen et al.
10,428,953 B2 10/2019 Lutjen et al.
10,443,419 B2 10/2019 Thomas et al.
10,443,420 B2 10/2019 Sippel et al.
10,450,897 B2 * 10/2019 Gallier .................. F01D 25/246
10,465,545 B2 11/2019 Cetel et al.
10,480,337 B2 * 11/2019 Vetters .................. F01D 11/005
10,533,446 B2 1/2020 Barak et al.
10,550,706 B2 2/2020 Lutjen et al.
10,577,963 B2 3/2020 Mccaffrey
10,577,977 B2 * 3/2020 Baucco ................. F01D 11/005
10,584,605 B2 3/2020 Sippel et al.
10,590,803 B2 3/2020 Quennehen et al.
10,598,045 B2 3/2020 Tableau et al.
10,605,120 B2 3/2020 Quennehen et al.
10,619,517 B2 4/2020 Quennehen et al.
10,626,745 B2 4/2020 Roussille et al.
10,633,994 B2 4/2020 Barker
10,648,362 B2 5/2020 Groves, II et al.
10,655,495 B2 5/2020 Groves, II et al.
10,655,501 B2 5/2020 Lepretre et al.
10,662,794 B2 5/2020 Das
10,689,998 B2 6/2020 Stapleton et al.
10,690,007 B2 6/2020 Quennehen et al.
10,704,404 B2 7/2020 Shi et al.
10,718,226 B2 7/2020 Vetters et al.
10,724,399 B2 7/2020 Carlin et al.
10,731,494 B2 8/2020 Dev et al.
10,731,509 B2 8/2020 Correia et al.
10,738,643 B2 8/2020 Mccaffrey et al.
10,753,221 B2 8/2020 Barker et al.
10,787,924 B2 9/2020 Quennehen et al.
10,794,204 B2 10/2020 Fitzpatrick et al.
10,801,345 B2 10/2020 Clum et al.
10,801,349 B2 10/2020 Mccaffrey
10,815,807 B2 10/2020 Vantassel et al.
10,815,810 B2 10/2020 Barker et al.
10,830,357 B2 11/2020 Mccaffrey et al.
10,890,079 B2 1/2021 Propheter-Hinckley et al.
10,907,487 B2 2/2021 Zurmehly et al.
10,907,501 B2 2/2021 Filippi et al.
10,934,872 B2 3/2021 Tableau et al.
10,934,873 B2 3/2021 Sarawate et al.
10,968,761 B2 4/2021 Barker et al.
10,968,777 B2 4/2021 Propheter-Hinckley et al.
10,982,559 B2 4/2021 Filippi
11,002,144 B2 5/2021 Azad et al.
11,015,613 B2 5/2021 Kerns et al.
11,021,988 B2 6/2021 Tableau et al.
11,021,990 B2 6/2021 Filippi
11,028,720 B2 6/2021 Tableau et al.
11,041,399 B2 6/2021 Lutjen et al.
11,047,245 B2 6/2021 Mccaffrey
11,066,947 B2 7/2021 Sippel et al.
11,073,045 B2 7/2021 Sippel et al.
11,078,804 B2 8/2021 Tableau et al.
11,085,316 B2 8/2021 Barker et al.
11,085,317 B2 8/2021 Johnson et al.
11,105,215 B2 8/2021 Roy Thill et al.
11,111,794 B2 9/2021 Bitzko et al.
11,111,802 B2 9/2021 Propheter-Hinckley et al.
11,111,822 B2 9/2021 Tableau et al.
11,111,823 B2 9/2021 Jarrossay et al.
11,125,096 B2 9/2021 Clark et al.
11,125,098 B2 9/2021 Barker et al.
11,143,050 B2 10/2021 Roy Thill et al.
11,149,574 B2 10/2021 Laroche
11,174,747 B2 11/2021 Roy Thill et al.
11,174,795 B2 11/2021 Lutjen et al.
11,181,006 B2 11/2021 Smoke et al.
11,187,094 B2 11/2021 Feldmann et al.
11,215,064 B2 1/2022 Arbona et al.
11,215,065 B2 1/2022 Starr et al.
11,215,081 B2 1/2022 Schilling et al.
11,248,480 B2 2/2022 Thirumalai et al.
11,255,208 B2 2/2022 Clark et al.
11,255,209 B2 2/2022 Clark et al.
11,286,812 B1 * 3/2022 Freeman ............... F01D 25/246
11,313,242 B2 4/2022 Cetel et al.
11,319,827 B2 5/2022 Clark et al.
11,319,828 B1 5/2022 Freeman et al.
11,326,463 B2 5/2022 Blaney et al.
11,326,470 B2 5/2022 Dyson et al.
11,346,237 B1 5/2022 Freeman et al.
11,346,251 B1 5/2022 Freeman et al.
11,365,635 B2 6/2022 Read et al.
11,441,434 B2 9/2022 Danis et al.
11,441,441 B1 9/2022 Freeman et al.
11,466,585 B2 10/2022 Arbona et al.
11,466,586 B2 10/2022 Sippel et al.
11,499,444 B1 11/2022 Freeman et al.
11,506,085 B2 11/2022 Jarrossay et al.
11,542,825 B2 1/2023 Hauswirth et al.
11,542,827 B2 1/2023 Quennehen et al.
11,624,291 B2 4/2023 Roy Thill et al.
11,624,292 B2 4/2023 Clark et al.
11,629,607 B2 4/2023 Freeman et al.
11,643,939 B2 5/2023 Stoyanov et al.
11,702,948 B2 7/2023 Hock et al.
11,702,949 B2 7/2023 Freeman et al.
11,713,694 B1 8/2023 Freeman et al.
11,732,604 B1 8/2023 Freeman et al.
11,761,351 B2 9/2023 Freeman et al.
11,773,751 B1 10/2023 Freeman et al.
11,781,440 B2 10/2023 Vincent et al.
11,781,448 B1 10/2023 Holleran
11,840,930 B2 12/2023 Propheter-Hinckley et al.
11,840,936 B1 12/2023 Freeman et al.
11,879,349 B2 1/2024 Schilling et al.
2023/0184124 A1 6/2023 Stoyanov et al.
2023/0332506 A1 10/2023 Freeman et al.
2024/0003267 A1 1/2024 Cazin et al.

* cited by examiner

TURBINE SHROUD ASSEMBLIES WITH CHANNELS FOR BUFFER CAVITY SEAL THERMAL MANAGEMENT

FIELD OF THE DISCLOSURE

The present disclosure relates generally to turbine shroud assemblies, and more specifically to sealing of turbine shroud assemblies used with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. In some examples, sealing between and coupling such components may present challenges.

SUMMARY

The present disclosure may comprise one or more of the following features and combinations thereof.

A turbine shroud assembly adapted for use with a gas turbine engine may include a carrier segment, a blade track segment, and a seal system. The carrier segment may be arranged circumferentially at least partway around an axis. The blade track segment may be arranged circumferentially at least partway around the axis to define a portion of a gas path of the gas turbine engine. The seal system may be arranged radially between the carrier segment and the blade track segment to block gases from flowing between the carrier segment and the blade track segment.

In some embodiments, the carrier segment may include an outer wall, a first support wall that extends radially inward from the outer wall, and a second support wall that extends radially inward from the outer wall. The second support wall may extend radially inward from the outer wall at a location spaced apart axially from the first support wall to define an attachment-receiving space.

In some embodiments, the first support wall may be formed to include a radially-inwardly opening first channel, a radially-inwardly opening second channel spaced apart axially from the first channel, and at least one buffer air passageway that extends radially into the first support wall axially between the first channel and the second channel. The first channel and the second channel each extend circumferentially relative to the axis. The at least one buffer air passageway is configured to discharge buffer air radially inward away from the carrier segment.

In some embodiments, the blade track segment may include a shroud wall and an attachment feature. The shroud wall may extend circumferentially partway around the axis. The attachment feature may extend radially outward from the shroud wall into the attachment-receiving space formed in the carrier segment.

In some embodiments, the seal system may include a buffer air seal assembly located radially between the carrier segment and the shroud wall of the blade track segment to block gases from flowing between the carrier segment and the blade track segment into the attachment-receiving space of the carrier segment. The buffer air seal assembly may include a first seal arranged in the first channel and engaged with the shroud wall and a second seal arranged in the second channel and engaged with the shroud wall.

In some embodiments, the first and second seals may each include a first seal member and a second seal member. The first seal member and the second seal member may each extend circumferentially at least partway about the axis. The second seal member may be arranged radially outward of the first seal member. The second seal member may be arranged radially outward of the first seal member so that the second seal member is positioned out of a direct flow path of the buffer air discharged by the at least one buffer air passageway to reduce a risk of oxidation of the second seal member. The second seal member may be compressed between the carrier segment and the first seal member and urge the first seal member into engagement with the shroud wall of the blade track segment.

In some embodiments, the second seal member may comprise a braid of metallic material. In some embodiments, the second seal member may have a rectangular cross-section when viewed circumferentially relative to the axis. In some embodiments, the first seal member may comprise a single strand of solid metallic material.

In some embodiments, the second seal member may be a hollow tube of metallic material. The hollow tube may be formed to include at least one notch. The notch may extend through a wall of the hollow tube.

In some embodiments, the first and second channel may cooperate to define a partition wall therebetween. The partition wall may extend circumferentially relative to the axis. The at least one buffer air passageway may extend radially through the partition wall.

In some embodiments, the first channel may be defined by a first partition-wall surface of the partition wall, a first end surface, and a first support-wall surface. The first end surface may extend axially from the first wall surface. The first support-wall surface may extend from the first end surface towards the blade track segment.

In some embodiments, the first support-wall surface may have a radially-extending section and an angled section. The radially-extending section of the first support-wall surface may extend radially-inward from the first end surface. The angled section of the first support-wall surface may extend radially-inward and axially forward from the radially-extending section of the first support-wall surface.

In some embodiments, the second channel may be defined by a second partition-wall surface of the partition wall, a second end surface, and a second support-wall surface. The second end surface may extend axially from the second partition-wall surface. The second support-wall surface may extend from the second end surface towards the blade track segment.

In some embodiments, the second support-wall surface may have a radially-extending section and an angled section. The radially-extending section of the second support-wall surface may extend radially-inward from the second end surface. The angled section of the second support-wall surface may extend radially-inward and axially aft from the radially-extending section of the second support-wall surface.

In some embodiments, the first partition-wall surface of the partition wall may have a radially-extending section that extends radially-inward from the first end surface and an angled section that extends radially-inward and axially aft from the radially-extending section of the first partition-wall surface. In some embodiments, the second partition-wall surface of the partition wall may have a radially-extending section that extends radially-inward from the second end surface and an angled section that extends radially-inward and axially forward from the radially-extending section of the second partition-wall surface.

In some embodiments, the second support wall may be formed to include a radially-inwardly opening third channel. The third channel may extend circumferentially relative to the axis. The turbine shroud assembly may further comprise a third seal arranged in the third channel.

In some embodiments, the third seal may include a first seal member and a second seal member. The first seal member and the second seal member may each extend circumferentially at least partway about the axis. The second seal member may be arranged radially outward of the first seal member.

In some embodiments, the second support wall may be further formed to include a radially-inwardly opening fourth channel spaced apart axially from the radially-inwardly opening third channel. The fourth channel may extend circumferentially relative to the axis.

In some embodiments, the turbine shroud assembly may further comprise a fourth seal arranged in the fourth channel. The fourth seal may include a first seal member and a second seal member. The first seal member and the second seal member may each extend circumferentially at least partway about the axis. The second seal member may be arranged radially outward of the first seal member.

According to another aspect of the present disclosure, a method may comprise providing a carrier segment, providing a blade track segment, and providing a buffer air seal assembly. The carrier segment may be arranged circumferentially at least partway around an axis. The blade track segment may be arranged circumferentially at least partway around the axis.

In some embodiments, the carrier segment may be formed to include a radially-inwardly opening first channel, a radially-inwardly opening second channel spaced apart axially from the radially-inwardly opening first channel, and at least one buffer air passageway. The first channel and the second channel may each extend circumferentially relative to the axis. The at least one buffer air passageway may extend radially into the first support wall axially between the first channel and the second channel.

In some embodiments, the blade track segment may have a shroud wall and an attachment feature. The shroud wall may extend circumferentially partway around the axis. The attachment feature may extend radially outward from the shroud wall.

In some embodiments, the buffer air seal assembly may include a first seal and a second seal. The method may further include arranging the first seal of the buffer air seal assembly in the first channel formed in the carrier segment and arranging the second seal of the buffer air seal assembly in the second channel formed in the carrier segment.

In some embodiments, the method may further include arranging the blade track segment adjacent to the carrier segment. The blade track segment may be arranged adjacent to the carrier segment so that the buffer air seal assembly is radially between the carrier segment and the shroud wall of the blade track segment to block gases from flowing between the carrier segment and the blade track segment.

In some embodiments, the method may further include discharging a flow of buffer air through the at least one buffer air passageway. The method may include discharging a flow of buffer air through the at least one buffer air passageway into the first channel.

In some embodiments, the first and second seals may each include a first seal member and a second seal member. The first seal member and the second seal member may each extend circumferentially at least partway about the axis.

In some embodiments, arranging the first seal in the first channel may include arranging the second seal member in the first channel before arranging the first seal member in the first channel so that the second seal member is located radially outward of the first seal member. In some embodiments, arranging the second seal in the second channel may include arranging the second seal member in the second channel before arranging the first seal member in the second channel so that the second seal member is located radially outward of the first seal member.

In some embodiments, the method may further include compressing the second seal member of the first and second seals between the carrier segment and the first seal member. The method may further include compressing the second seal member of the first and second seals between the carrier segment and the first seal member to urge the first seal member into engagement with the shroud wall of the blade track segment.

In some embodiments, the first and second channel may cooperate to define a partition wall therebetween. The partition wall may extend circumferentially relative to the axis. The at least one buffer air passageway may extend radially through the partition wall.

In some embodiments, the method may further include providing at least one retainer and inserting the at least one retainer axially into the carrier segment and through the attachment feature of the blade track segment. The method may include inserting the at least one retainer axially into the carrier segment and through the attachment feature of the blade track segment to couple the blade track segment to the carrier segment.

These and other features of the present disclosure will become more apparent from the following description of the illustrative embodiments.

DETAILED DESCRIPTION OF THE DRAWINGS

Figure 1:
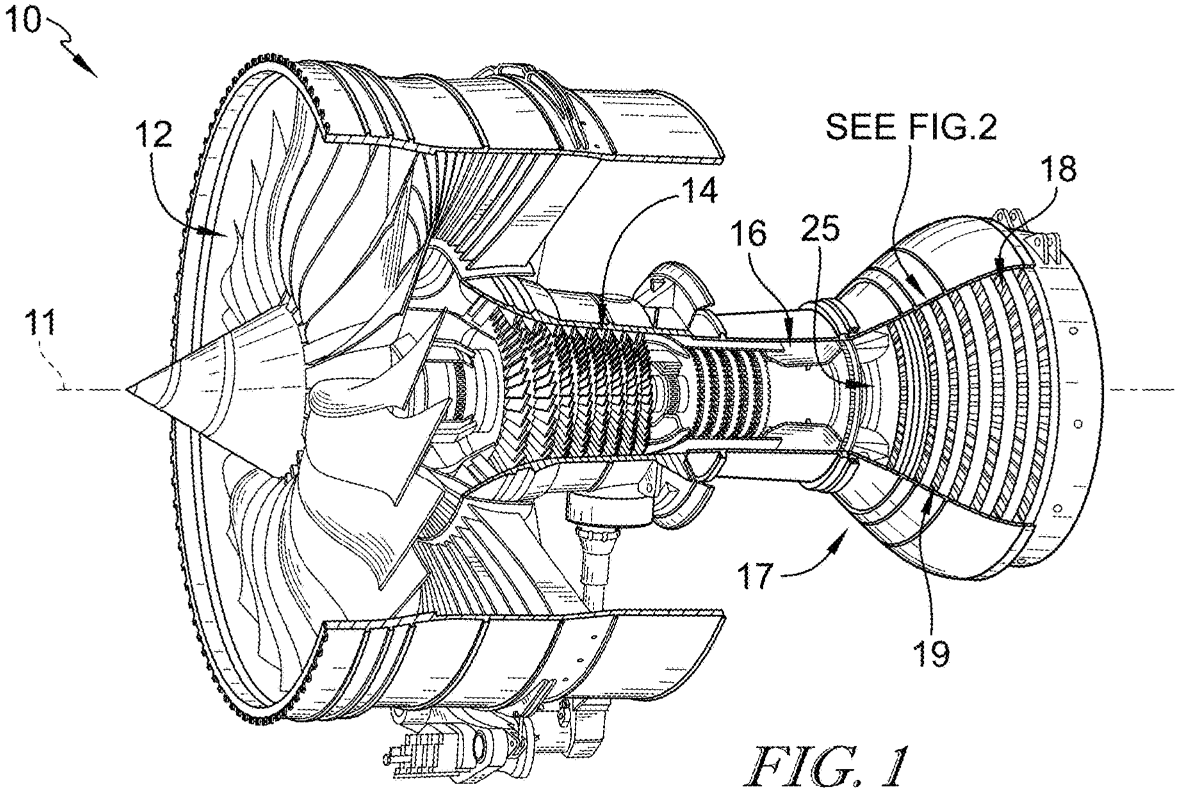
FIG. 1 is a cut-away perspective view of a gas turbine engine showing that the exemplary engine includes a fan, a compressor, a combustor, and a turbine and suggesting that the turbine includes turbine wheel assemblies and static vane assemblies surrounded by a turbine shroud assembly.

For the purposes of promoting an understanding of the principles of the disclosure, reference will now be made to a number of illustrative embodiments illustrated in the drawings and specific language will be used to describe the same.

A turbine shroud segment 22 is shown in FIGS. 2-6 and is adapted for use in a gas turbine engine 10 as shown in FIG. 1. The turbine shroud segment 22 includes a carrier segment 24 arranged circumferentially at least partway around an axis 11 of the gas turbine engine 10, a blade track segment 26 arranged circumferentially at least partway around the axis 11, a mount system 28 configured to couple the carrier segment 24 to the blade track segment 26, and a seal system 30 as shown in FIGS. 2-6. The seal system 30 is configured to seal gaps between the carrier segment 24 and the blade track segment 26 to prevent or block gases from a gas path 25 of the gas turbine engine 10 from flowing between the carrier segment 24 and the blade track segment 26.

The blade track segment 26 is a ceramic matrix composite component configured to directly face the high temperatures of the gas path 25 of the gas turbine engine 10 to define a portion of the gas path 25. The carrier segment 24 is a metallic support component configured to interface with other metallic components of the gas turbine engine 10, such as the case 17, to support the blade track segment 26 to radially locate the blade track segment 26 relative to the axis 11. The mount system 28 includes at least one retainer 78, 80, and illustratively the mount system 28 includes two retainers 78, 80 that each extend axially into the blade track segment 26 and the carrier segment 24 to couple the blade track segment 26 to the carrier segment 24. The seal system 30 is arranged radially between the carrier segment 24 and the blade track segment 26 to seal a cavity 48 (sometimes referred to as an attachment-receiving space) defined by the carrier segment 24 to block gases from flowing between the carrier segment 24 and the blade track segment 26 and into the cavity 48.

The seal system 30 includes a forward seal assembly 30F located radially between the carrier segment 24 and the blade track segment 26 on a forward side of the blade track segment 26 and an aft seal assembly 30A located radially between the carrier segment 24 and the blade track segment 26 on an aft side of the blade track segment 26. The forward seal assembly 30F includes a first seal 32 and a second seal 34 each arranged in a corresponding radially-inwardly opening channel 52, 54 formed in the carrier segment 24. The aft seal assembly 30A includes a third seal 36 arranged in a corresponding channel 56 formed in the carrier segment 24.

Figure 4:
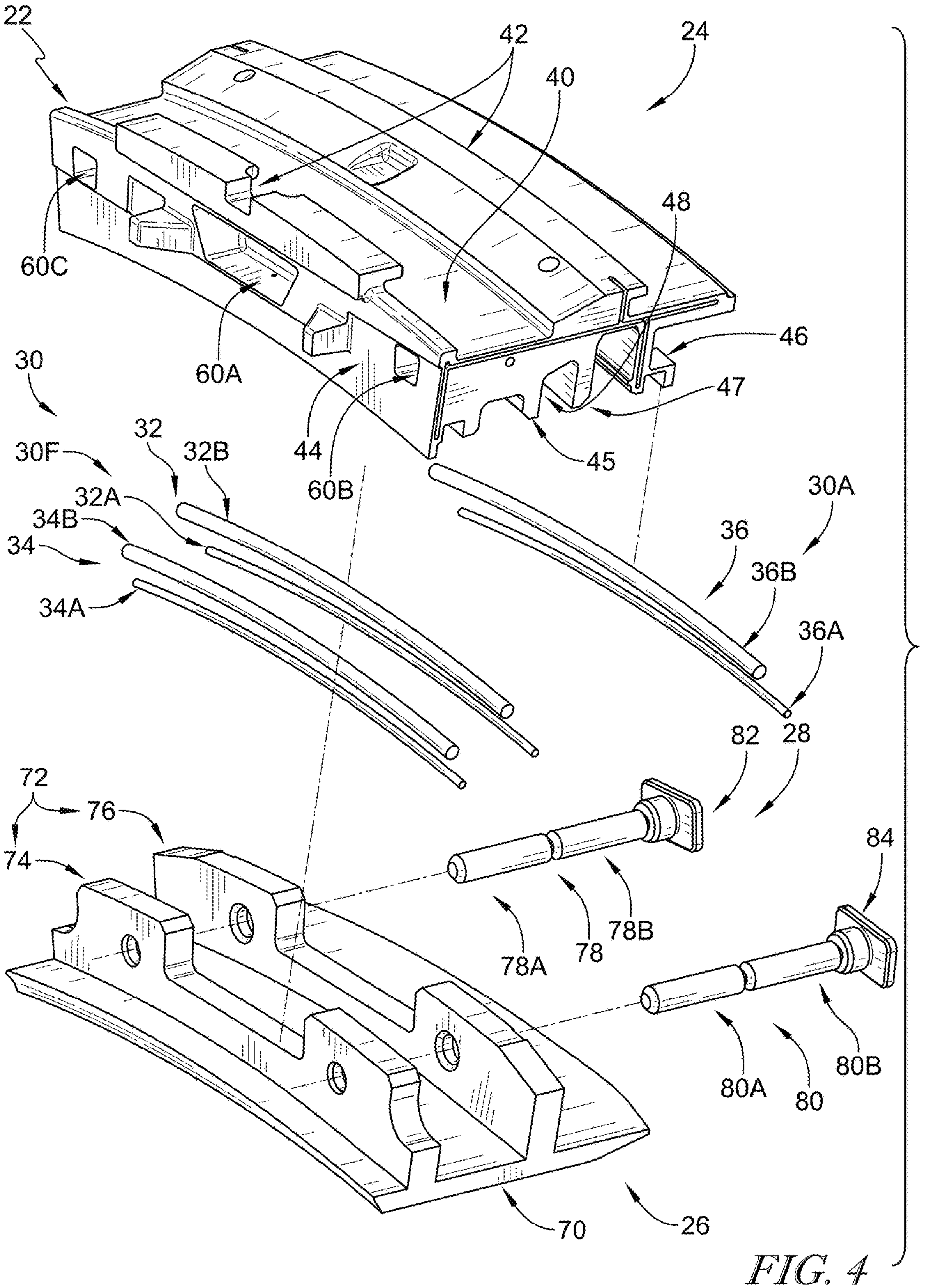
FIG. 4 is an exploded view of the turbine shroud assembly of FIG. 3 showing the seal system includes a forward seal assembly having a first seal and a second seal configured to be arranged in respective channels formed in the carrier segment and an aft seal assembly having a third seal arranged in a respective channel formed in the carrier segment.
Figure 5:
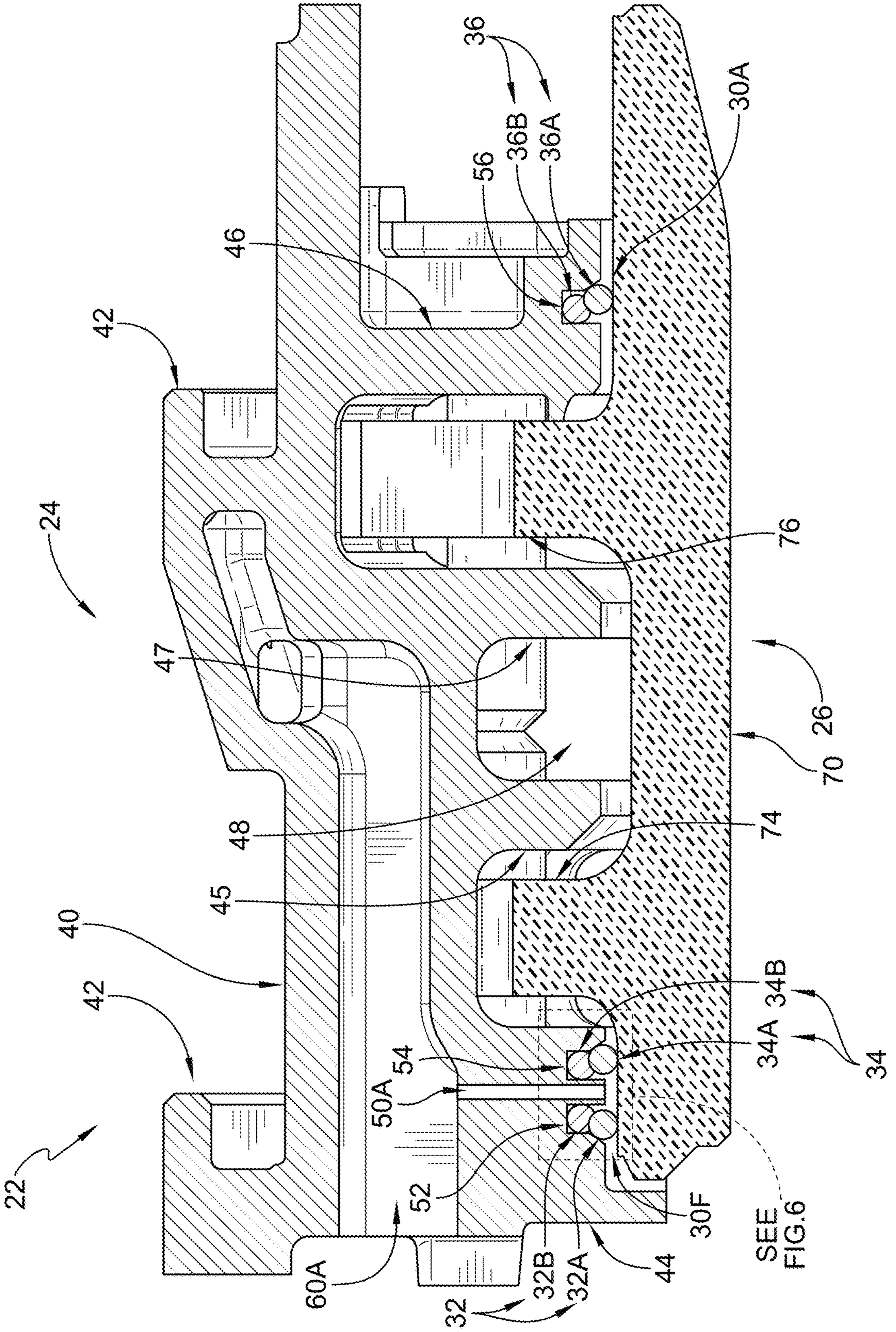
FIG. 5 is a cross-section view of the turbine shroud assembly of FIG. 3 taken along line 5-5 showing the forward support wall of the carrier segment is formed to include a radially-inwardly opening first channel that receives the first seal included in the forward seal assembly, a radially-inwardly opening second channel spaced apart axially from the first channel that receives the second seal included in the forward seal assembly, and a buffer air passageway configured to discharge buffer air axially between the two channels, and further showing the aft support wall of the carrier segment is formed to include a radially-inwardly opening third channel that receives the third seal included in the aft seal assembly.
Figure 6:
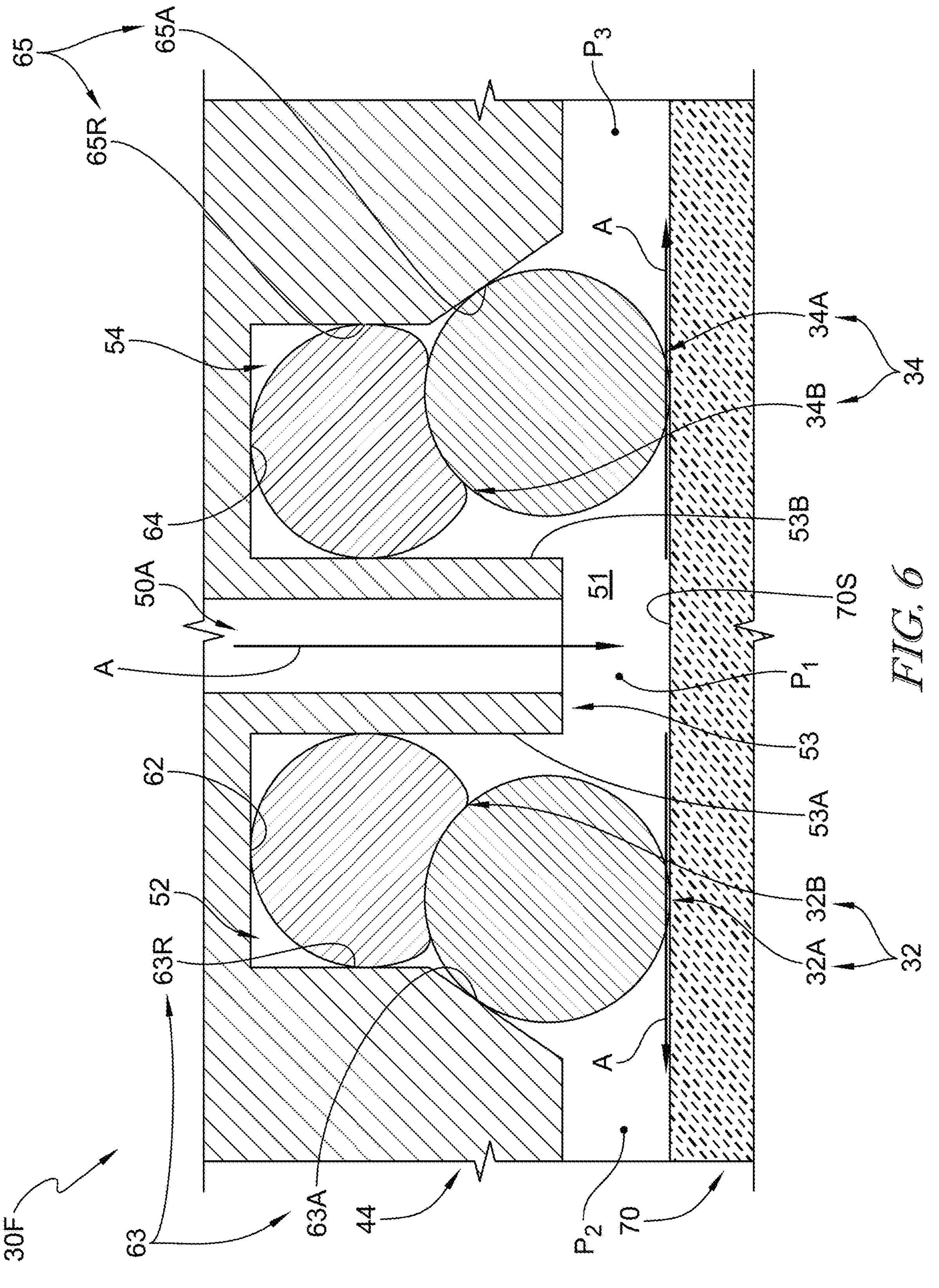
FIG. 6 is a detail view of FIG. 5 showing the forward seal assembly—also referred to as the buffer air seal assembly-includes the first seal arranged in the first channel and the second seal arranged in the second channel so that buffer air is discharged axially between the two seals, and further showing of the first seal and the second seal each include a first seal member and a second seal member arranged radially outward of the first seal member in the respective channel so that the second seal member is not positioned directly in the flow path of the buffer air flowing axially forward and aft.

Each seal 32, 34, 36 includes a first seal member 32A, 34A, 36A and a second seal member 32B, 34B, 36B as shown in FIGS. 4-6. The first seal member 32A, 34A, 36A and the second seal member 32B, 34B, 36B each extend circumferentially at least partway about the axis 11. The second seal member 32B, 34B, 36B is arranged radially outward of the first seal member 32A, 34A, 36A in the corresponding radially-inwardly opening channel 52, 54, 56 and is compressed between the carrier segment 24 and the first seal member 32A, 34A, 34B. In this way, the second seal member 32B, 34B, 36B urges the first seal member 32A, 34A, 36A into engagement with the blade track segment 26.

During operation of a gas turbine engine 10, the hot, high-pressure products directed into the turbine 18 from the combustor 16 flow across a radially-inwardly opening surface of a shroud wall 70 of the blade track segment 26 that defines a portion of the gas path 25. The seal system 30 blocks the hot, high-pressure products from flowing into the cavity 48 of the turbine shroud segment 22. Some turbine shroud assemblies use seals having at least two seal members, where one of the seals is configured to be compressed between the carrier segment 24 and the blade track segment 26 to bias the other seal member(s) into engagement with the shroud wall 70 of the blade track segment 26, thereby improving the seal therebetween.

In some embodiments, the carrier segment 24 may also include buffer air passageways to direct relatively high-pressure air (sometimes referred to as buffer air) into the channel(s) formed in the carrier segment 24 to distribute the high-pressure air along the seal members. The high-pressure air supplied to the channel(s) is used help keep the gases in the gas path 25 out of the cavity 48 in the event of a seal failure. The high-pressure or buffer air is usually jetted through the seal members arranged in the channel(s), which may cause the seal members to wear, specifically oxidize, significantly reducing the overall life of the seal members and the effectiveness of the seal members.

Therefore, the seals 32, 34, 36 are each arranged in their own discrete channel 52, 54, 56 formed in the carrier segment 24 as shown in FIGS. 5 and 6. The seals 32, 34, 36 are each arranged in their own discrete channel 52, 54, 56 so that the second seal members 32B, 34B, 36B of each seal 32, 34, 36 are positioned out of a direct flow path of the buffer air flowing across the seals 32, 34, 36.

The arrangement of the seals 32, 34, 36 also allows the buffer air to be discharged between the seals 32, 34, 36. As shown in FIGS. 5 and 6, at least one buffer air passageway 50A, 50B, 50C formed in the carrier segment 24 discharges buffer air axially between the seals 32, 34. The buffer air passageway 50A, 50B, 50C extends into the carrier segment 24 axially between the first and second channels 52, 54 rather than directly into the channels 52, 54.

Instead of jetting the buffer air through the seal members 32A, 32B, 34A, 34B of each seal 32, 34, the buffer air passageway(s) discharges the buffer air into a space or buffer air cavity 51 axially between the seals 32, 34 as suggested by arrows A in FIGS. 5 and 6. The buffer air passageway(s) discharges the buffer air into the space axially between the seals 32, 34 so that the seal members 32B, 34B of each seal 32, 34 are positioned out of a flow path of the buffer air. By locating the seal members 32B, 34B out of the flow path of the discharged buffer air so that buffer air does not flow across the seal members 32B, 34B, the risk of oxidation or wear of the seal members 32B, 34B is reduced, improving the life of the seal members 32B, 34B.

The buffer air seal assembly 30F includes the first seal 32 arranged in a first channel 52 formed in the carrier segment 24 and the second seal 34 arranged in a second channel 54 formed in the carrier segment 24 as shown in FIGS. 5 and 6. Each channel 52, 54 extends radially into the carrier segment 24 and opens radially-inwardly toward the blade track segment 26. The second channel 54 is spaced apart axially from the first channel 52 to define a partition wall 53 therebetween. The at least one buffer air passageway 50A, 50B, 50C extends radially through partition wall 53 of the carrier segment 24 axially between the first and second channels 52, 54.

The buffer air passageway 50A, 50B, 50C discharges the buffer air axially between the first channel 52, i.e. the first seal 32, and the second channel 54, i.e. the second seal 34 as shown in FIGS. 5 and 6. In the illustrative embodiment, the buffer air passageway 50A, 50B, 50C discharges the buffer air into a space or buffer air cavity 51 defined axially between the seals 32, 34 as shown in FIG. 6. The buffer air cavity 51 is defined between the two seals 32, 34.

Each seal 32, 34 includes a first seal member 32A, 34A and a second seal member 32B, 34B as shown in FIGS. 4-6. The first seal member 32A, 34A and the second seal member 32B, 34B each extend circumferentially at least partway about the axis 11. The second seal member 32B, 34B is arranged radially outward of the first seal member 32A, 34A in the corresponding channel 52, 54 so that the second seal member 32B, 34B is positioned out of the flow path of the buffer air, as suggested by arrows A, discharged by the buffer air passageway 50A, 50B, 50C to reduce a risk of oxidation of the second seal member 32B, 34B.

Figure 8:
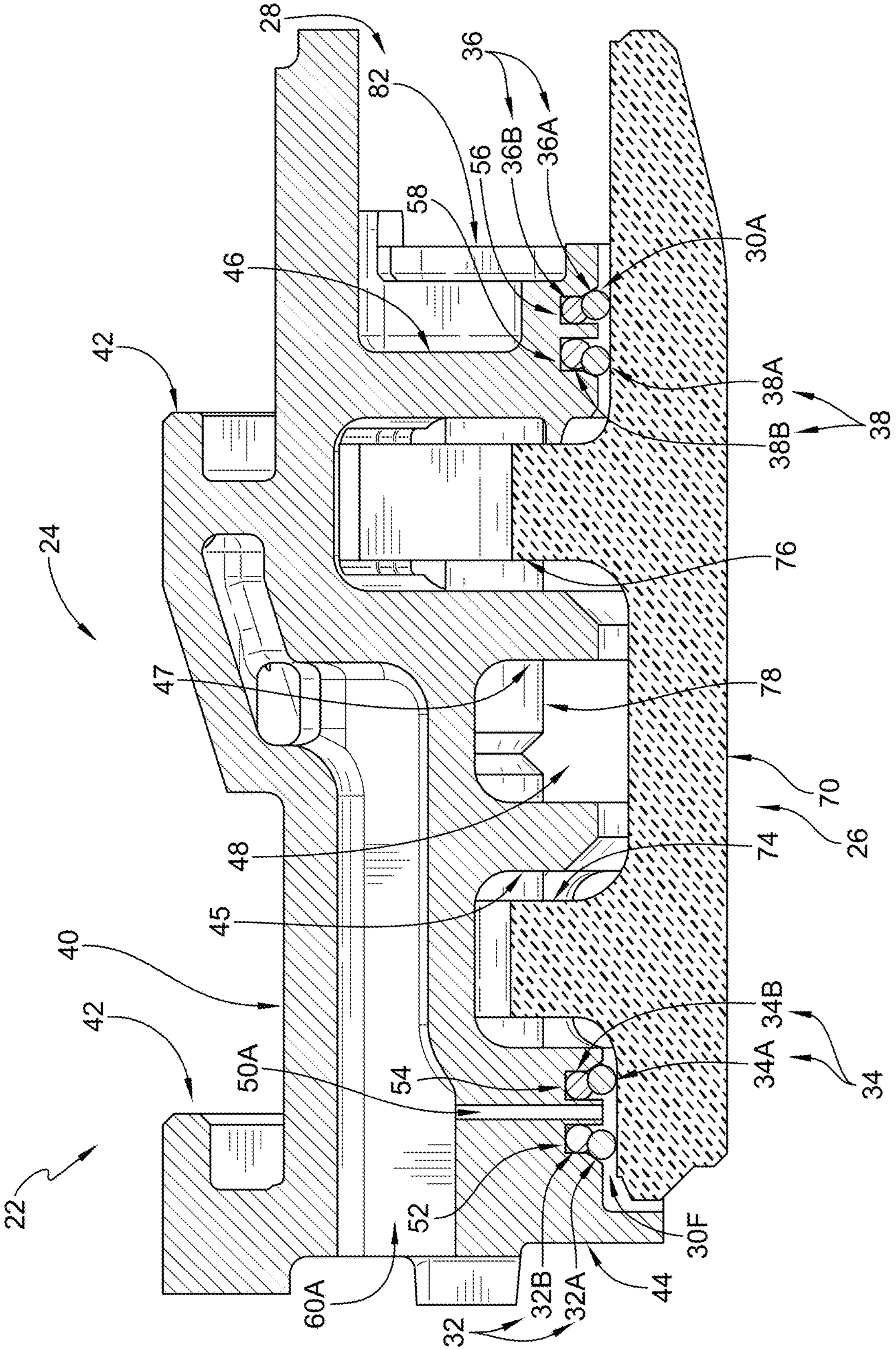
FIG. 8 is a cross-section view of another turbine shroud assembly similar to the turbine shroud assembly of FIG. 5 showing the aft seal assembly may include a third seal arranged in a radially-inwardly opening third channel formed in the aft support wall of the carrier segment and a fourth seal arranged in a radially-inwardly opening fourth channel formed in the aft support wall of the carrier segment and spaced apart axially from the third channel.

In the illustrative embodiment, the aft seal assembly 30A includes the third seal 36 arranged in a third channel 56 formed in the carrier segment 24 as shown in FIG. 5. In some embodiments, the aft seal assembly 30A' may include two seals 36, 38 like the forward seal assembly 30F as shown in FIG. 8. Instead of one seal 36, the aft seal assembly 30A' may include a third seal assembly 36 arranged in a third channel 56 formed in the carrier segment 24 and a fourth seal assembly 38 arranged in a fourth channel 58 formed in the carrier segment 24 as shown in FIG. 8. The third channel 56 is spaced apart axially from the fourth channel 58 to define a second partition wall 55 therebetween as shown in FIG. 8.

Like the seals 32, 34 of the forward seal assembly 30F, the third and fourth seals 36, 38 of the aft seal assembly 30A' each include a first seal member 36A, 38A and a second seal member 36B, 38B as shown in FIG. 8. The first seal member 36A, 38A and the second seal member 36B, 38B each extend circumferentially at least partway about the axis 11. The second seal member 36B, 38B is arranged radially outward of the first seal member 36A, 38A in the corresponding channel 56, 58 as shown in FIG. 8.

In the illustrative embodiment, buffer air is only discharged between the first and second seals 32, 34 in the forward seal assembly 30F—also referred to as a buffer air seal assembly 30F. The carrier segment 24 only includes buffer air passageways 50A, 50B, 50C at the buffer air seal assembly 30F to discharge buffer air axially between the first and second seals 32, 34. In some embodiments, the carrier segment 24 may include buffer air passageways 50A, 50B, 50C that discharge buffer air axially between the seals 36, 38 of the aft seal assembly 30A'.

The first seal member 32A, 34A, 36A, 38A of each seal 32, 34, 36, 38 is a wire seal or a single strand of solid metallic material. The second seal member 32B, 34B, 36B, 38B of each seal 32, 34, 36, 38 is elastic or compliant such that the second seal member 32B, 34B, 36B, 38B biases or urges the first seal member 32A, 34A, 36A, 38A into engagement with an outer surface 70S of the shroud wall 70 of the blade track segment 26 when compressed between the carrier segment 24 and the first seal member 32A, 34A, 36A, 38A.

In the illustrative embodiment, the second seal member 32B, 34B, 36B, 38B is a braid of metallic material, sometimes also referred to as a braid seal. The second seal member 32B, 34B, 36B, 38B is a single braid of metallic material in the illustrative embodiment. In some embodiments, the second seal member 32B, 34B, 36B, 38B comprises a ceramic-containing core surrounded by the braid of metallic material. The braid of metallic material may form an overbraid sheath around the ceramic core.

The channels 52, 54, 56, 58 formed in the carrier segment 24 are shaped so that the second seal member 32B, 34B, 36B, 38B is positioned out of a direct flow path of the buffer air flowing between the carrier segment 24 and the blade track segment 26. In the illustrative embodiment, the third channel 56 has a similar shape as the second channel 54 and the fourth channel 58 has a similar shape as the first channel 52.

The first channel 52 is defined by a first partition-wall surface 53A of the first partition wall 53, a first end surface 62 that extends axially from the first partition-wall surface 53A, and a first support-wall surface 63 that extends from the first end surface 62 towards the blade track segment 26 as shown in FIGS. 5 and 6. The first support-wall surface 63 has a radially-extending section 63R that extends radially-inward from the first end surface 62 and an angled section 63A that extends radially-inward and axially forward from the radially-extending section 63R of the first support-wall surface 63.

The second channel 54 is defined by a second partition-wall surface 53B of the first partition wall 53, a second end surface 64 that extends axially from the second partition-wall surface 53B, and a second support-wall surface 65 that extends from the second end surface 64 towards the blade track segment 26 as shown in FIGS. 5 and 6. The second support-wall surface 65 has a radially-extending section 65R that extends radially-inward from the second end surface 64 and an angled section 65A that extends radially-inward and axially aft from the radially-extending section 65R of the second support-wall surface 65.

With the seal system 30 of the present disclosure initially described above, the gas turbine engine 10 is now described in more detail. The gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan may be replaced with a propeller, drive shaft, or other suitable configuration.

Figure 2:
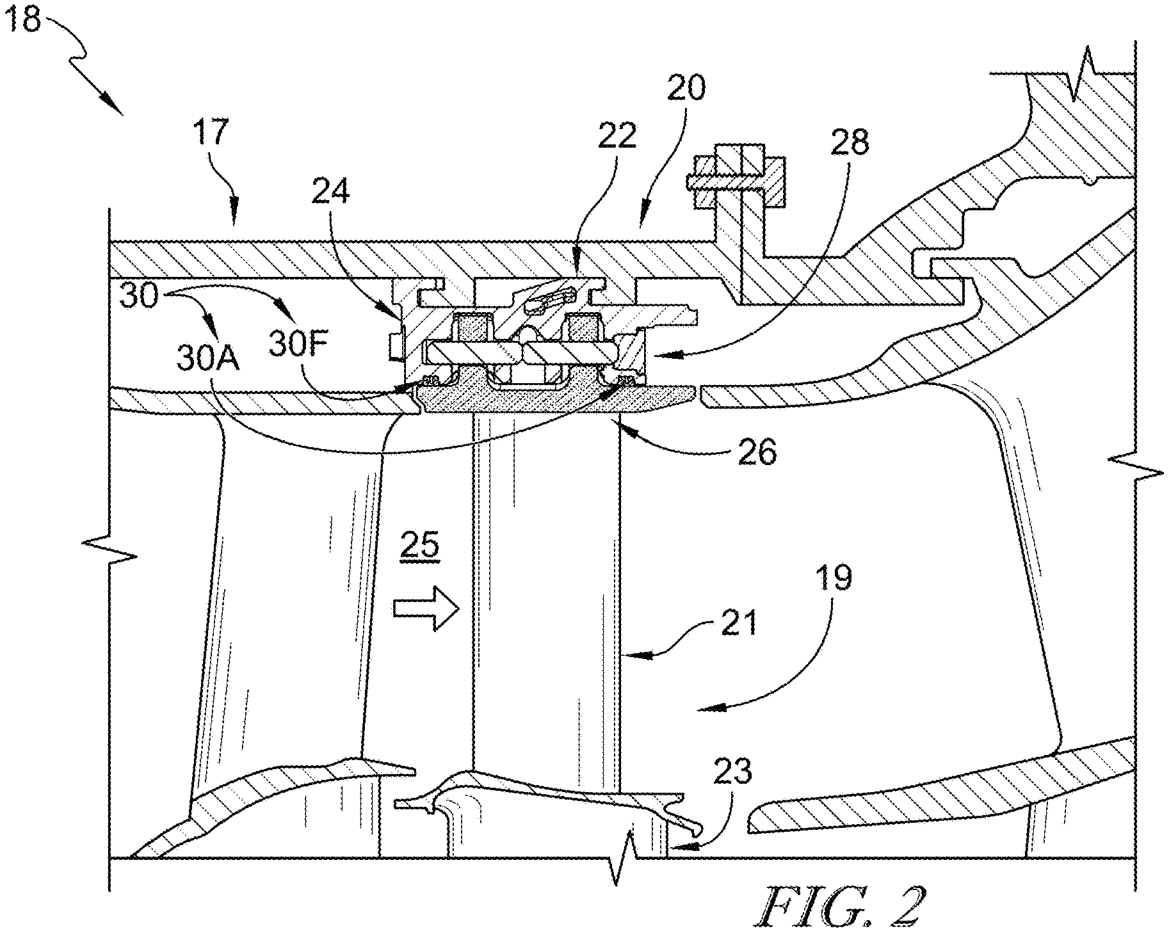
FIG. 2 is a partial cross-sectional view of the gas turbine engine of FIG. 1 showing a portion of the turbine in which the turbine shroud assembly is located radially outward from blades of a turbine wheel assembly to block gasses from passing over the blades without interacting with the blades, and further showing the turbine shroud assembly includes a carrier segment, a blade track segment coupled to the carrier segment to define a portion of a gas path of the gas turbine engine, and a seal system configured to seal between the carrier segment and the blade track segment to block gases flowing through the gas path from flowing between the carrier segment and the blade track segment.

The turbine 18 includes at least one turbine wheel assembly 19 and a turbine shroud 20 positioned to surround the turbine wheel assembly 19 as shown in FIGS. 1 and 2. The turbine wheel assembly 19 includes a plurality of blades 21 coupled to a rotor disk 23 for rotation with the disk 23. The hot, high pressure combustion products from the combustor 16 are directed toward the blades 21 of the turbine wheel assemblies 19 along the gas path 25. The turbine shroud 20 is coupled to the outer case 17 of the gas turbine engine 10 and extends around the turbine wheel assembly 19 to block gases from passing over the turbine blades 21 during use of the turbine 18 in the gas turbine engine 10.

In the illustrative embodiment, the turbine shroud 20 is made up of a number of turbine shroud segment assemblies 22 that each extend circumferentially partway around the axis 11 and cooperate to surround the turbine wheel assembly 19. In other embodiments, the turbine shroud 20 is annular and non-segmented to extend fully around the axis 11 and surround the turbine wheel assembly 19. In yet other embodiments, certain components of the turbine shroud 20 are segmented while other components are annular and non-segmented.

Each turbine shroud segment 22 includes the carrier segment 24, blade track segment, the mount system 28, and the seal system 30 as shown in FIGS. 2-6. The carrier segment 24 and the blade track segment 26 are arranged circumferentially partway about the axis 11. The blade track segment 26 includes the shroud wall 70 that extends circumferentially partway around the axis 11 to define a portion of the gas path 25 and an attachment feature 72 that extends radially from the shroud wall 70 into the cavity 48 of the carrier segment 24. The mount system 28 is configured to couple the blade track segment 26 to the carrier segment 24. The seal system 30 is arranged radially between the carrier segment 24 and the blade track segment 26 to seal gaps therebetween.

The carrier segment 24 includes an outer wall 40, a pair of hangers 42, a forward support wall 44, and an aft support wall 46 as shown in FIGS. 3-6. The outer wall 40 extends circumferentially at least partway about the axis 11. The hangers 42 extend radially outward from the outer wall 40 and engage the case 17 to couple the turbine shroud segment 22 to the rest of the engine 10. The forward support wall 44 extends radially inward from the outer wall 40 at a forward end of the outer wall 40 axially forward of the attachment feature 72 and the aft support wall 46 extends radially inward from the outer wall 40 at an aft end of the outer wall 40 axially aft of the attachment feature 72.

Figure 3:
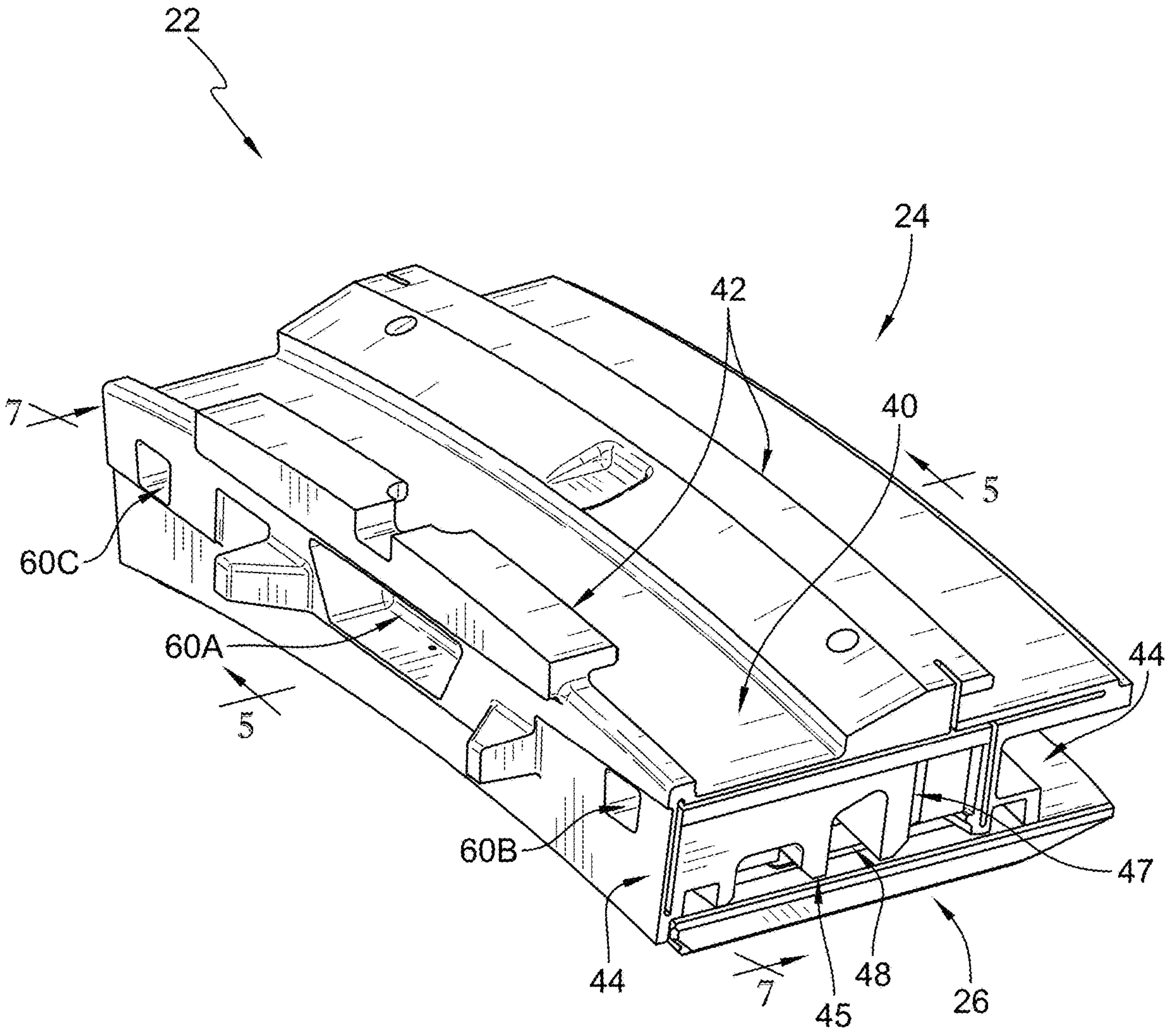
FIG. 3 is a perspective view of a portion of the turbine shroud assembly of FIG. 2 showing the turbine shroud assembly includes the carrier segment and the blade track segment made from ceramic matrix composite materials coupled to the carrier segment.

In the illustrative embodiment, the carrier segment 24 further includes a first intermediate support wall 45 and a second intermediate support wall 47 as shown in FIGS. 3, 4, and 6. The first intermediate support wall 45 and the second intermediate support wall 47 each extend radially inward from the outer wall 40 of the carrier segment 24 axially between the first and second support walls 44, 46. The second intermediate support wall 47 is spaced apart axially from the first intermediate support wall 45 in the illustrative embodiment.

The forward and aft support walls 44, 46 of the carrier segment 24 each include corresponding channels 52, 54, 56 as shown in FIGS. 5 and 6. The forward support wall 44 is formed to include the first channel 52 and the second channel 54. The second channel 54 is spaced apart axially from the first channel 52 to define a first partition wall 53 therebetween. The aft support wall 46 is formed to include the third channel 56.

In some embodiments, the aft support wall 46 is formed to include the third channel 56 and the fourth channel 58 for the two seals 36, 38 of the aft seal assembly 30A' as shown in FIG. 8. The fourth channel 58 is spaced apart axially from the third channel 56 to define the second partition wall 55 therebetween.

Figure 7:
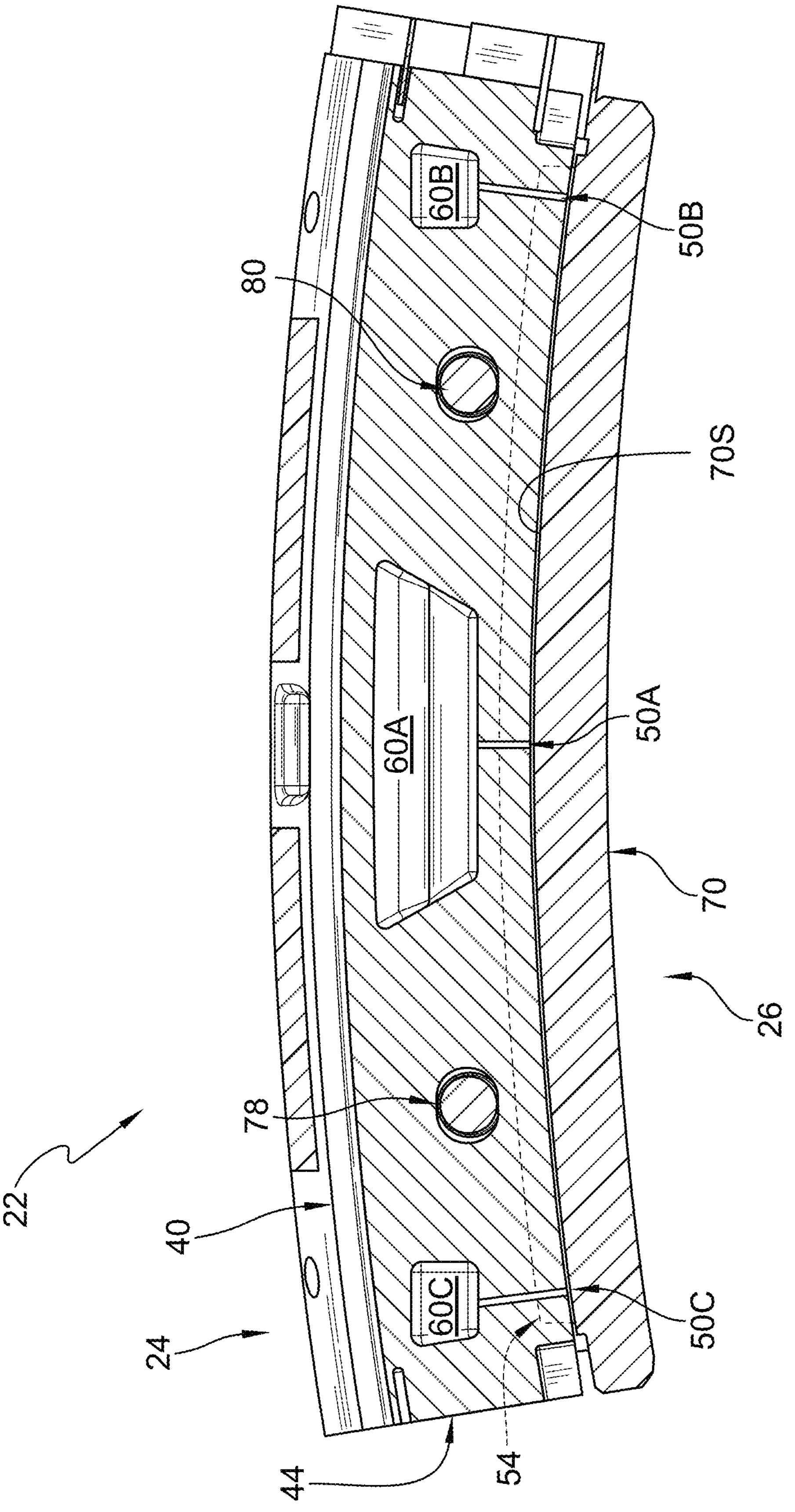
FIG. 7 is a cross-section view of the turbine shroud assembly of FIG. 3 taken along line 7-7 showing the forward support wall is formed to include a plurality of buffer air passageways spaced apart circumferentially about the axis.

In the illustrative embodiment, only the forward support wall 44 includes the buffer air passageway 50A, 50B, 50C as shown in FIGS. 5-7. The forward support wall 44 includes at least one discrete buffer air passageway 50A, 50B, 50C that extends radially into the forward support wall 44 through the first partition wall 53 defined axially between the first channel 52 and the second channel 54. In the illustrative embodiment, the forward support wall 44 includes a plurality of buffer air passageways 50A, 50B, 50C that are spaced apart circumferentially about the axis 11 as shown in FIG. 7.

In the illustrative embodiment, each buffer air passageway 50A, 50B, 50C extends from an outer cavity 60A, 60B, 60C formed in the outer wall 40 of the carrier segment 24 as shown in FIGS. 5 and 7. The buffer air flows from the outer cavity 60A, 60B, 60C to the buffer air passageways 50A, 50B, 50C. In some embodiments, the carrier segment 24 is formed to include an outer cavity 60A, 60B, 60C for each buffer air passageway 50A, 50B, 50C that supplies the corresponding buffer air passageway 50A, 50B, 50C with buffer air.

In the illustrative embodiment, the first channel 52 is defined by a first partition-wall surface 53A of the first partition wall 53, a first end surface 62 that extends axially from the first partition-wall surface 53A, and a first support-wall surface 63 that extends from the first end surface 62 towards the blade track segment 26 as shown in FIGS. 5 and 6. The first support-wall surface 63 has a radially-extending section 63R that extends radially-inward from the first end surface 62 and an angled section 63A that extends radially-inward and axially forward from the radially-extending section 63R of the first support-wall surface 63.

In the illustrative embodiment, the second channel 54 is defined by a second partition-wall surface 53B of the first partition wall 53, a second end surface 64 that extends axially from the second partition-wall surface 53B, and a second support-wall surface 65 that extends from the second end surface 64 towards the blade track segment 26 as shown in FIGS. 5 and 6. The second support-wall surface 65 has a radially-extending section 65R that extends radially-inward from the second end surface 64 and an angled section 65A that extends radially-inward and axially aft from the radially-extending section 65R of the second support-wall surface 65.

In the illustrative embodiment, the third and fourth channels 56, 58 have similar shapes to the first and second channels 52, 54 as shown in FIG. 8. Therefore, the third and fourth channels 56, 58 are defined by similar surfaces as the first and second channels 52, 54.

The blade track segment 26 includes the shroud wall 70 and the attachment feature 72 as shown in FIGS. 4-6. The shroud wall 70 that extends circumferentially partway around the axis 11. The attachment feature 72 includes a first attachment flange 74 and a second attachment flange 76 that each extend radially outward from the shroud wall 70. The second attachment flange 76 is spaced apart axially from the first attachment flange 74.

In the illustrative embodiment, the forward support wall 44 extends radially inward from the outer wall 40 axially forward of the first attachment flange 74 of the blade track segment 26. The aft support wall 46 extends radially inward from the outer wall 40 axially aft of the second attachment flange 76 of the blade track segment 26. The first intermediate support wall 45 extends radially inward from the outer wall 40 axially aft of the first attachment flange 74 so that the first attachment flange 74 is axially between the forward support wall 44 and the first intermediate support wall 45. The second intermediate support wall 47 extends radially inward from the outer wall 40 axially forward of the second attachment flange 76 of the blade track segment 26 so that the second attachment flange 76 is located axially between the aft support wall 46 and the second intermediate support wall 47.

The mount system 28 includes at least one retainer 78, 80, illustratively two retainers 78, 80 that each extend axially into the blade track segment 26 and the carrier segment 24 to couple the blade track segment 26 to the carrier segment 24. The retainers 78, 80 extend axially into the forward support wall 44, through the first attachment flange 74, the intermediate support walls 43, 45, and the second attachment flange 76, and into the aft support wall 46 of the carrier segment 24 so as to couple the blade track segment 26 to the carrier segment 24.

In the illustrative embodiment, the mount system 28 includes the retainers 78, 80 and corresponding retainer plugs 82, 84 as shown in FIG. 4. Each of the retainer plugs 82 extends into an installation apertures formed in the aft support wall 46 to block removal of the corresponding retainers 78, 80 through the installation apertures in the carrier segment 24.

In the illustrative embodiment, the retainers 78, 80 are both split pins as shown in FIG. 4. Each retainer 78, 80 includes a first pin 78A, 80A and a second pin 78B, 80B arranged axially aft of the first pin 78A, 80A as shown in FIG. 4.

A method of assembling and using the turbine shroud segment 22 may include several steps. The method includes arranging the seals 32, 34, 36 in the corresponding channels 52, 54, 56 before arranging the blade track segment 26 adjacent to the carrier segment 24. The method includes arranging the first seal 32 in the first channel 52, arranging the second seal 34 in the second channel 54, and arranging the third seal 36 in the third channel 56. In some embodiments, the method may further include arranging the fourth seal 38 in the fourth channel 58.

The seals 32, 34, 36 may be arranged in the corresponding channels 52, 54, 56 in any order. In other words, the first seal 32 may be arranged in the first channel 52 first and the third seal 36 may be arranged in the third channel 56 last. Alternatively, the third seal 36 may be arranged in the third channel 56 first and the first seal 32 arranged in the first channel 52 last. In some embodiments, the fourth seal 38 may be arranged in the fourth channel 58 before the other seals 32, 34, 36 are arranged in the respective channels 52, 54, 56. Alternatively, the fourth seal 38 may be arranged in the fourth channel 58 last.

The step of arranging the first seal 32 in the first channel 52 includes inserting or arranging the second seal member 32B of the first seal 32 in the first channel 52. Once the second seal member 32B is arranged in the first channel 52, the first seal member 32A of the first seal 32 is inserted or arranged in the first channel 52 so that second seal member 32B is located radially outward of the first seal member 32A.

The step of arranging the second seal 34 in the second channel 54 includes inserting or arranging the second seal member 34B of the second seal 34 in the second channel 54. Once the second seal member 34B is arranged in the second channel 54, the first seal member 34A of the second seal 34 is inserted or arranged in the second channel 54 so that second seal member 34B is located radially outward of the first seal member 34A.

The step of arranging the third seal 36 in the third channel 56 includes inserting or arranging the second seal member 36B of the third seal 36 in the third channel 56. Once the second seal member 36B is arranged in the third channel 56, the first seal member 36A of the third seal 36 is inserted or arranged in the third channel 56 so that second seal member 36B is located radially outward of the first seal member 36A.

Additionally, for the embodiment of FIG. 8, the step of arranging the fourth seal 38 in the fourth channel 58 includes inserting or arranging the second seal member 38B of the fourth seal 38 in the fourth channel 58. Once the second seal member 38B is arranged in the fourth channel 58, the first seal member 38A of the fourth seal 38 is inserted or arranged in the fourth channel 58 so that second seal member 38B is located radially outward of the first seal member 38A.

Once all the seals 32, 34, 36 are arranged in the corresponding channels 52, 54, 56, the blade track segment 26 is arranged adjacent to the carrier segment 24 so that the seals 32, 34, 36 of the forward and aft seal assemblies 30F, 30A are radially between the carrier segment 24 and the shroud wall 70 of the blade track segment 26 to block gases in the gas path from flowing between the carrier segment 24 and the blade track segment 26. The blade track segment 26 is arranged adjacent to the carrier segment 24 so that the attachment feature 72 extends into the cavity 48. The blade track segment 26 is arranged adjacent to the carrier segment 24 so that the first attachment flange 74 and the second attachment flange 76 extend into sections of the cavity 48.

In some embodiments, the method further includes inserting retainers 78, 80 into the carrier segment 24 and the blade track segment 26 to couple the blade track segment 26 to the carrier segment 24. The method includes inserting one retainer 78 axially into the carrier segment 24 and through the attachment feature 72 of the blade track segment 26 to couple the blade track segment 26 to the carrier segment 24. The method further includes inserting another retainer 80 axially into the carrier segment 24 and through the attachment feature 72 of the blade track segment 26 to couple the blade track segment 26 to the carrier segment 24. The second retainer 80 is inserted at a location spaced apart circumferentially from the first retainer 78.

The method further includes compressing the second seal member 32B, 34B of the first and second seals 32, 34 between the carrier segment 24 and the first seal member 32A, 34A to urge the first seal member 32A, 34A into engagement with the shroud wall 70 of the blade track segment 26. The method further includes compressing the second seal members 32B, 34B, 36B of each seal 32, 34, 36 between the carrier segment 24 and the first seal member 32A, 34A, 36A to urge the first seal member 32A, 34A, 36A into engagement with the shroud wall 70 of the blade track segment 26.

The method further includes discharging a flow of buffer air through the at least one buffer air passageway 50A, 50B, 50C as suggested in FIGS. 5 and 6. The flow of buffer air is suggested by arrows A. The method may further include discharging the flow of buffer air through the plurality of buffer air passageways 50A, 50B, 50C. The flow of buffer air flows axially forward and aft as suggested by arrows A in FIGS. 5 and 6.

The buffer air discharged into the buffer air cavity 51 defined between the two seals 32, 34 establishes a higher pressure $P_1$ in the buffer air cavity 51 than the pressure $P_2$ in the region axially forward of the buffer air seal assembly 30F and the pressure $P_3$ in the cavity 48 as shown in FIG. 6. The pressure $P_3$ in the cavity 48 is lower than the pressure $P_2$ in the region axially forward of the buffer air seal assembly 30F radially outward of the gas path 25 as shown in FIG. 6. The buffer air may be provided from the compressor 14 of the gas turbine engine 10.

Figure 9:
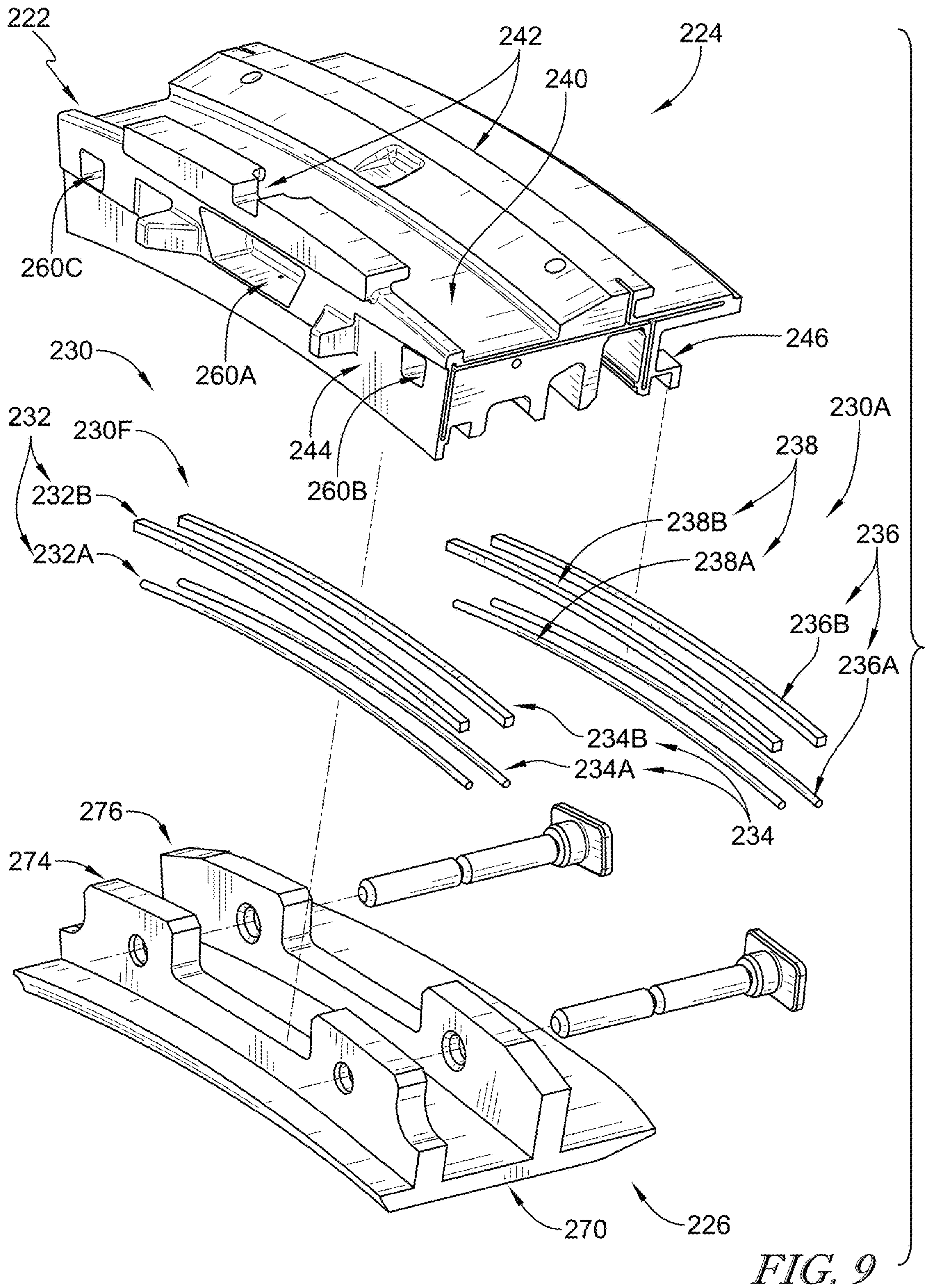
FIG. 9 is an exploded view of another turbine shroud assembly included in the gas turbine engine of FIG. 1 showing the turbine shroud assembly includes a carrier segment, a blade track segment, and a seal system having a forward seal assembly and an aft seal assembly that each include seals configured to be arranged in respective channels formed in the carrier segment, and further showing certain seal members of each seal have a rectangular cross-section when viewed in the circumferential direction.
Figure 10:
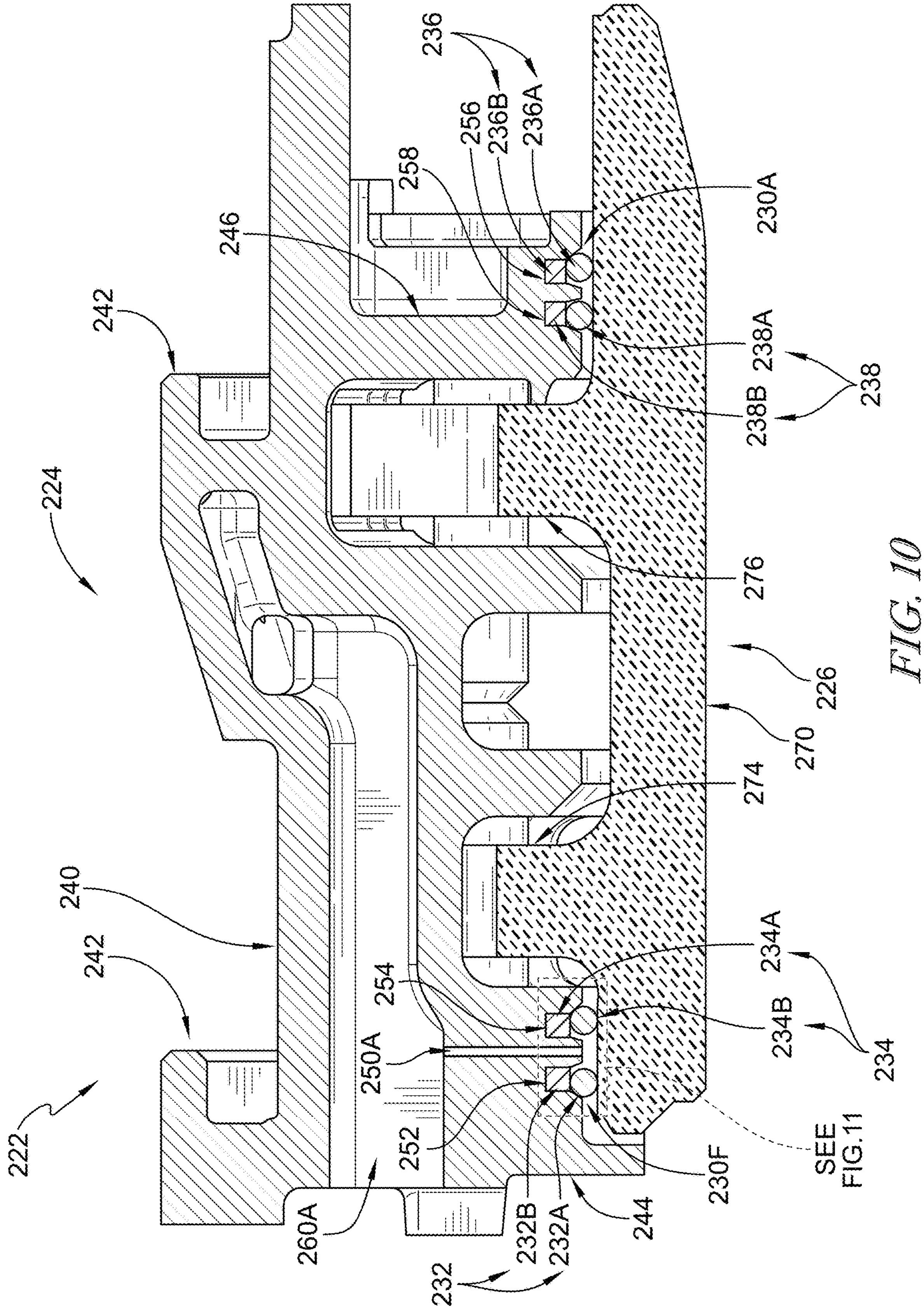
FIG. 10 is a cross-section view of the turbine shroud assembly of FIG. 9 showing the carrier segment includes a forward support wall and an aft support wall spaced apart axially from the forward support wall, and further showing the forward support wall is formed to define a first channel that receives a first seal included in the forward seal assembly, a second channel spaced apart axially from the first channel that receives a second seal included in the forward seal assembly, and a buffer air passageway configured to discharge buffer air axially between the two channels.
Figure 11:
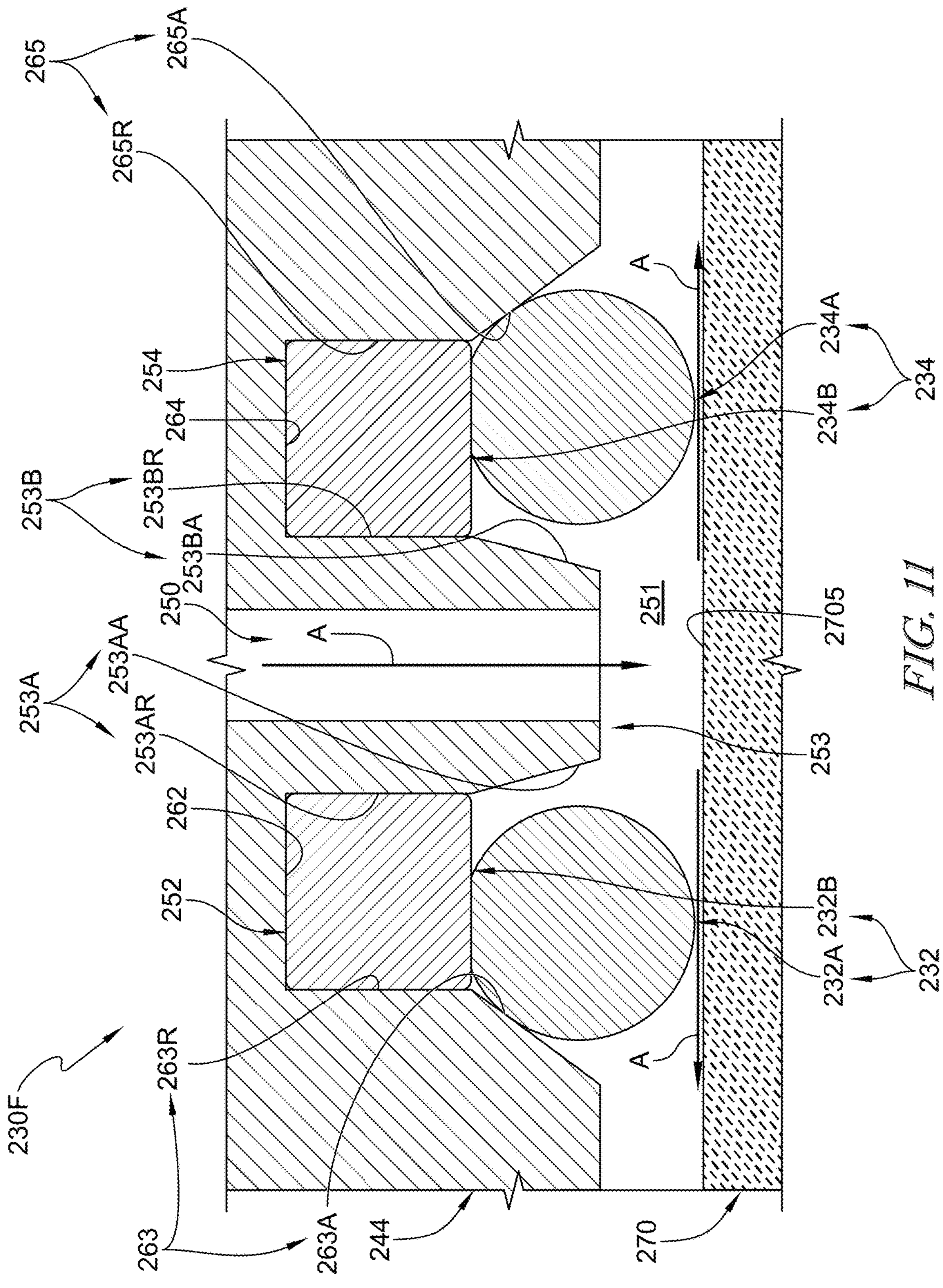
FIG. 11 is a detail view of FIG. 10 showing the forward seal assembly—also referred to as the buffer air seal assembly-includes the first seal arranged in the first channel and the second seal arranged in the second channel so that buffer air is discharged axially between the two seals, and further showing each seal includes a first seal member and a second seal member arranged radially outward of the first seal member that has a rectangular cross-section when viewed in the circumferential direction.

Another embodiment of a turbine shroud segment 222 in accordance with the present disclosure is shown in FIGS. 9-11. The turbine shroud segment 222 is substantially similar to the turbine shroud segment 22 shown in FIGS. 1-8 and described herein. Accordingly, similar reference numbers in the 200 series indicate features that are common between the turbine shroud segment 22 and the turbine shroud segment 222. The description of the turbine shroud segment 22 is incorporated by reference to apply to the turbine shroud segment 222, except in instances when it conflicts with the specific description and the drawings of the turbine shroud segment 22.

The turbine shroud segment 222 includes a carrier segment 224 arranged circumferentially at least partway around an axis 11 of the gas turbine engine 10, a blade track segment 226 arranged circumferentially at least partway around the axis 11, and a seal system 230 as shown in FIGS. 9-11. The seal system 230 is configured to seal gaps between the carrier segment 224 and the blade track segment 226 to prevent or block gases from a gas path 25 of the gas turbine engine 10 from flowing between the carrier segment 224 and the blade track segment 226.

The seal system 230 includes a forward seal assembly 230F located radially between the carrier segment 224 and the blade track segment 226 on a forward side of the blade track segment 226 and an aft seal assembly 230A located radially between the carrier segment 224 and the blade track segment 226 on an aft side of the blade track segment 226 as shown in FIGS. 9-11. The forward seal assembly 230F includes a first seal 232 and a second seal 234 each arranged in a corresponding channel 252, 254 formed in the carrier segment 224. The aft seal assembly 230A includes a third seal 236 and a fourth seal 238 each arranged in a corresponding channel 256, 258 formed in the carrier segment 224.

The buffer air seal assembly 230F includes the first seal 232 arranged in a first channel 252 formed in the carrier segment 224 and the second seal 234 arranged in a second channel 254 formed in the carrier segment 224 as shown in FIGS. 10 and 11. The second channel 254 is spaced apart axially from the first channel 252 to define a partition wall 253 therebetween. The at least one buffer air passageway 250A extends radially through partition wall 253 of the carrier segment 224 axially between the first and second channels 252, 254.

The buffer air passageway 250A discharges the buffer air axially between the first channel 252, i.e. the first seal 232, and the second channel 254, i.e. the second seal 234 as shown in FIGS. 10 and 11. In the illustrative embodiment, the buffer air passageway 250A discharges the buffer air into a space or buffer air cavity 251 defined axially between the seals 232, 234 as shown in FIG. 11. The buffer air cavity 251 is defined between the two seals 232, 234.

Each seal 232, 234, 236, 238 includes a first seal member 232A, 234A, 236A, 238A and a second seal member 232B, 234B, 236B, 238B as shown in FIGS. 4-6. The first seal member 232A, 234A, 236A, 238A and the second seal member 232B, 234B, 236B, 238B each extend circumferentially at least partway about the axis 11. The second seal member 232B, 234B, 236B, 238B is arranged radially outward of the first seal member 232A, 234A, 236A, 238A in the corresponding channel 52, 54, 56, 58 and is compressed between the carrier segment 224 and the first seal member 32A, 34A, 34B, 38A. In this way, the second seal member 232B, 234B, 236B, 238B urges the first seal member 232A, 234A, 236A, 238A into engagement with the blade track segment 226.

In the illustrative embodiment, the first seal member 232A, 234A, 236A, 238A of each seal 232, 234, 236, 238 is a wire seal or a single strand of solid metallic material. The second seal member 232B, 234B, 236B, 238B of each seal 232, 234, 236, 238 is elastic or compliant such that the second seal member 232B, 234B, 236B, 238B biases or urges the first seal member 232A, 234A, 236A, 238A into engagement with the shroud wall 270 of the blade track segment 226 when compressed between the carrier segment 224 and the first seal member 232A, 234A, 236A, 238A as suggested in FIGS. 10 and 11.

In the illustrative embodiment, the second seal member 232B, 234B, 236B, 238B is a braid of metallic material as shown in FIGS. 10 and 11. In the illustrative embodiment, the braid of metallic material is a high-temperature pump packing material braid. The second seal member 232B, 234B, 236B, 238B has a rectangular cross-sectional shape when viewed in the circumferential direction. The shape of the second seal member 232B, 234B, 236B, 238B matches the shape of a portion of the corresponding channel 252, 254, 256, 258 in the illustrative embodiment.

The carrier segment 224 includes an outer wall 240, a pair of hangers 242, a forward support wall 244, and an aft support wall 246 as shown in FIGS. 9-11. The outer wall 240 extends circumferentially at least partway about the axis 11. The forward support wall 244 extends radially inward from the outer wall 240 axially forward of the first attachment flange 274 of the attachment feature 272 included on the blade track segment 226 and the aft support wall 46 extends radially inward from the outer wall 240 axially aft of the second attachment flange 276 of the attachment feature 272 included on the blade track segment 226.

The forward and aft support walls 244, 246 of the carrier segment 224 each include channels 252, 254, 256, 258 as shown in FIGS. 10 and 11. The forward support wall 246 is formed to include the first channel 252, the second channel 254, and the buffer air passageway 250A. The second channel 254 is spaced apart axially from the first channel 252 to define a first partition wall 253 therebetween. The aft support wall 246 is formed to include the third channel 256 and the fourth channel 258. The fourth channel 258 is spaced apart axially from the third channel 256 to define a second partition wall 255 therebetween. The buffer air passageway 250A extends radially into the forward support wall 244 through the first partition wall 253 defined axially between the first channel 252 and the second channel 254.

The buffer air passageway 250A, 50B, 50C extends from one of the outer cavities 260A, 260B, 260C formed in the outer wall 240 of the carrier segment 224 as shown in FIGS. 9 and 10. The buffer air flows from one of the outer cavities 260A, 260B, 260C to the buffer air passageways 250A. In some embodiments, the forward support wall 244 includes a plurality of buffer air passageways like in FIGS. 1-7.

The first channel 252 is defined by a first partition-wall surface 253A of the first partition wall 253, a first end surface 262 that extends axially from the first partition-wall surface 53A, and a first support-wall surface 263 that extends from the first end surface 262 towards the blade track segment 226 as shown in FIGS. 5 and 6. The second channel 254 is defined by a second partition-wall surface 253B of the first partition wall 253, a second end surface 264 that extends axially from the second partition-wall surface 253B, and a second support-wall surface 265 that extends from the second end surface 264 towards the blade track segment 226 as shown in FIGS. 5 and 6.

The first support-wall surface 263 has a radially-extending section 263R that extends radially-inward from the first end surface 262 and an angled section 263A that extends radially-inward and axially forward from the radially-extending section 263R of the first support-wall surface 263. The second support-wall surface 65 has a radially-extending section 265R that extends radially-inward from the second end surface 264 and an angled section 265A that extends radially-inward and axially aft from the radially-extending section 265R of the second support-wall surface 265.

In the illustrative embodiment, the first partition-wall surface 253A of the first partition wall 253 has a radially-extending section 253AR that extends radially-inward from the first end surface 262 and an angled section 253AA that extends radially-inward and axially aft from the radially-extending section 253AR of the first partition-wall surface 253A as shown in FIGS. 10 and 11. In the illustrative embodiment, the second partition-wall surface 253B of the first partition wall 253 has a radially-extending section 253BR that extends radially-inward from the second end surface 264 and an angled section 253BA that extends radially-inward and axially forward from the radially-extending section 253BR of the second partition-wall surface 253B.

A method of assembling and using the turbine shroud segment 222 may include several steps. The method includes arranging the seals 232, 234, 236, 238 in the corresponding channels 252, 254, 256, 258 before arranging the blade track segment 226 adjacent to the carrier segment 224. The method includes arranging the first seal 232 in the first channel 252, arranging the second seal 234 in the second channel 254, arranging the third seal 236 in the third channel 256, and arranging the fourth seal 238 in the fourth channel 258.

The step of arranging the first seal 232 in the first channel 252 includes inserting or arranging the second seal member 232B of the first seal 232 in the first channel 252. Once the second seal member 232B is arranged in the first channel 252, the first seal member 232A of the first seal 232 is inserted or arranged in the first channel 252 so that second seal member 232B is located radially outward of the first seal member 232A. This process may be repeated for the other seals 234, 236, 238.

Once all the seals 232, 234, 236, 238 are arranged in the corresponding channels 252, 254, 256, 258, the blade track segment 226 is arranged adjacent to the carrier segment 224 so that the seals 232, 234, 236, 238 of the forward and aft seal assemblies 230F, 230A are radially between the carrier segment 224 and the shroud wall 270 of the blade track segment 226 to block gases in the gas path from flowing between the carrier segment 224 and the blade track segment 226. The method further includes compressing the second seal members 232B, 234B, 236B, 238B of each seal 232, 234, 236, 238 between the carrier segment 224 and the first seal member 232A, 234A, 236A, 238A to urge the first seal member 232A, 234A, 236A, 238A into engagement with the shroud wall 270 of the blade track segment 226. The method further includes discharging a flow of buffer air through the at least one buffer air passageway 250A.

Another embodiment of a turbine shroud segment 322 in accordance with the present disclosure is shown in FIGS. 12-15. The turbine shroud segment 322 is substantially similar to the turbine shroud segment 22 shown in FIGS. 1-8 and described herein. Accordingly, similar reference numbers in the 300 series indicate features that are common between the turbine shroud segment 22 and the turbine shroud segment 322. The description of the turbine shroud segment 22 is incorporated by reference to apply to the turbine shroud segment 322, except in instances when it conflicts with the specific description and the drawings of the turbine shroud segment 22.

The turbine shroud segment 322 includes a carrier segment 324 arranged circumferentially at least partway around an axis 11 of the gas turbine engine 10, a blade track segment 326 arranged circumferentially at least partway around the axis 11, and a seal system 330 as shown in FIGS. 12-15. The seal system 330 is configured to seal gaps between the carrier segment 324 and the blade track segment 326 to prevent or block gases from a gas path 35 of the gas turbine engine 10 from flowing between the carrier segment 324 and the blade track segment 326.

The seal system 330 includes a forward seal assembly 330F located radially between the carrier segment 324 and the blade track segment 326 on a forward side of the blade track segment 326 and an aft seal assembly 330A located radially between the carrier segment 324 and the blade track segment 326 on an aft side of the blade track segment 326. The forward seal assembly 330F includes a first seal 332 and a second seal 334 each arranged in a corresponding channel 352, 354 formed in the carrier segment 324. The aft seal assembly 330A includes a third seal 336 and a fourth seal 338 each arranged in a corresponding channel 356, 358 formed in the carrier segment 324.

The buffer air seal assembly 330F includes the first seal 332 arranged in a first channel 352 formed in the carrier segment 324 and the second seal 334 arranged in a second channel 354 formed in the carrier segment 324 as shown in FIGS. 10 and 11. The second channel 354 is spaced apart axially from the first channel 352 to define a partition wall 353 therebetween. The at least one buffer air passageway 350A extends radially through partition wall 353 of the carrier segment 324 axially between the first and second channels 352, 354.

The buffer air passageway 350A discharges the buffer air axially between the first channel 352, i.e. the first seal 332, and the second channel 354, i.e. the second seal 334 as shown in FIGS. 10 and 11. In the illustrative embodiment, the buffer air passageway 350A discharges the buffer air into a space or buffer air cavity 351 defined axially between the seals 332, 334 as shown in FIG. 11. The buffer air cavity 351 is defined between the two seals 332, 334.

Each seal 332, 334, 336, 338 includes a first seal member 332A, 334A, 336A, 338A and a second seal member 332B, 334B, 336B, 338B as shown in FIGS. 12-15. The first seal member 332A, 334A, 336A, 338A and the second seal member 332B, 334B, 336B, 338B each extend circumferentially at least partway about the axis 11. The second seal member 332B, 334B, 336B, 338B is arranged radially outward of the first seal member 332A, 334A, 336A, 338A in the corresponding channel 52, 54, 56, 58 and is compressed between the carrier segment 324 and the first seal member 32A, 34A, 34B, 38A. In this way, the second seal member 332B, 334B, 336B, 338B urges the first seal member 332A, 334A, 336A, 338A into engagement with the blade track segment 326.

In the illustrative embodiment, the first seal member 332A, 334A, 336A, 338A of each seal 332, 334, 336, 338 is a wire seal or a single strand of solid metallic material. The second seal member 332B, 334B, 336B, 338B of each seal 332, 334, 336, 338 is elastic or compliant such that the second seal member 332B, 334B, 336B, 338B biases or urges the first seal member 332A, 334A, 336A, 338A into engagement with the shroud wall 370 of the blade track segment 326 when compressed between the carrier segment 324 and the first seal member 332A, 334A, 336A, 338A as suggested in FIGS. 13 and 14.

Figure 12:
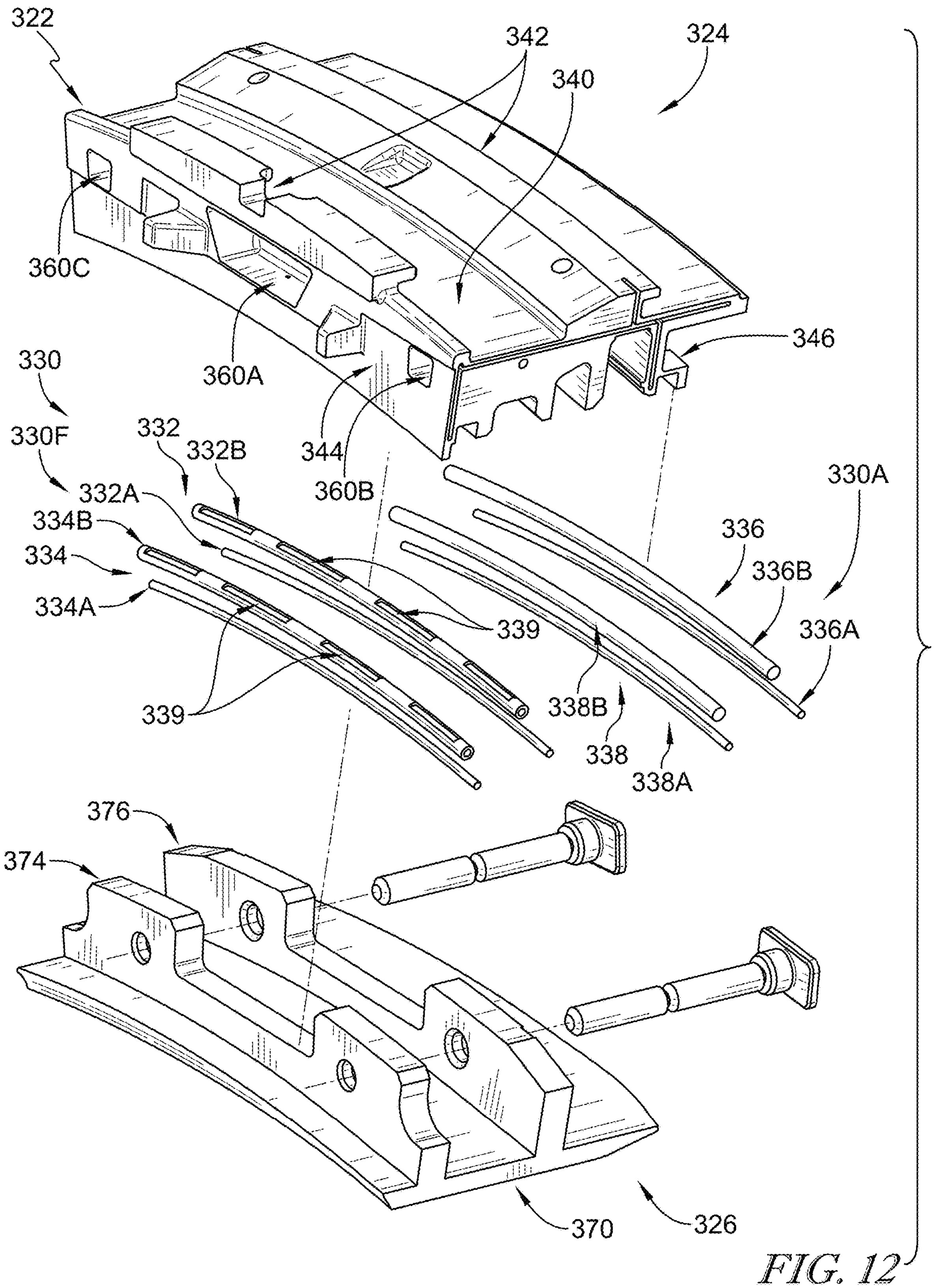
FIG. 12 is an exploded view of another turbine shroud assembly included in the gas turbine engine of FIG. 1 showing the turbine shroud assembly includes a carrier segment, a blade track segment, and a seal system having a forward seal assembly and an aft seal assembly that each include seals configured to be arranged in respective channels formed in the carrier segment, and further showing certain seal members of each seal are a hollow tube.
Figure 13:
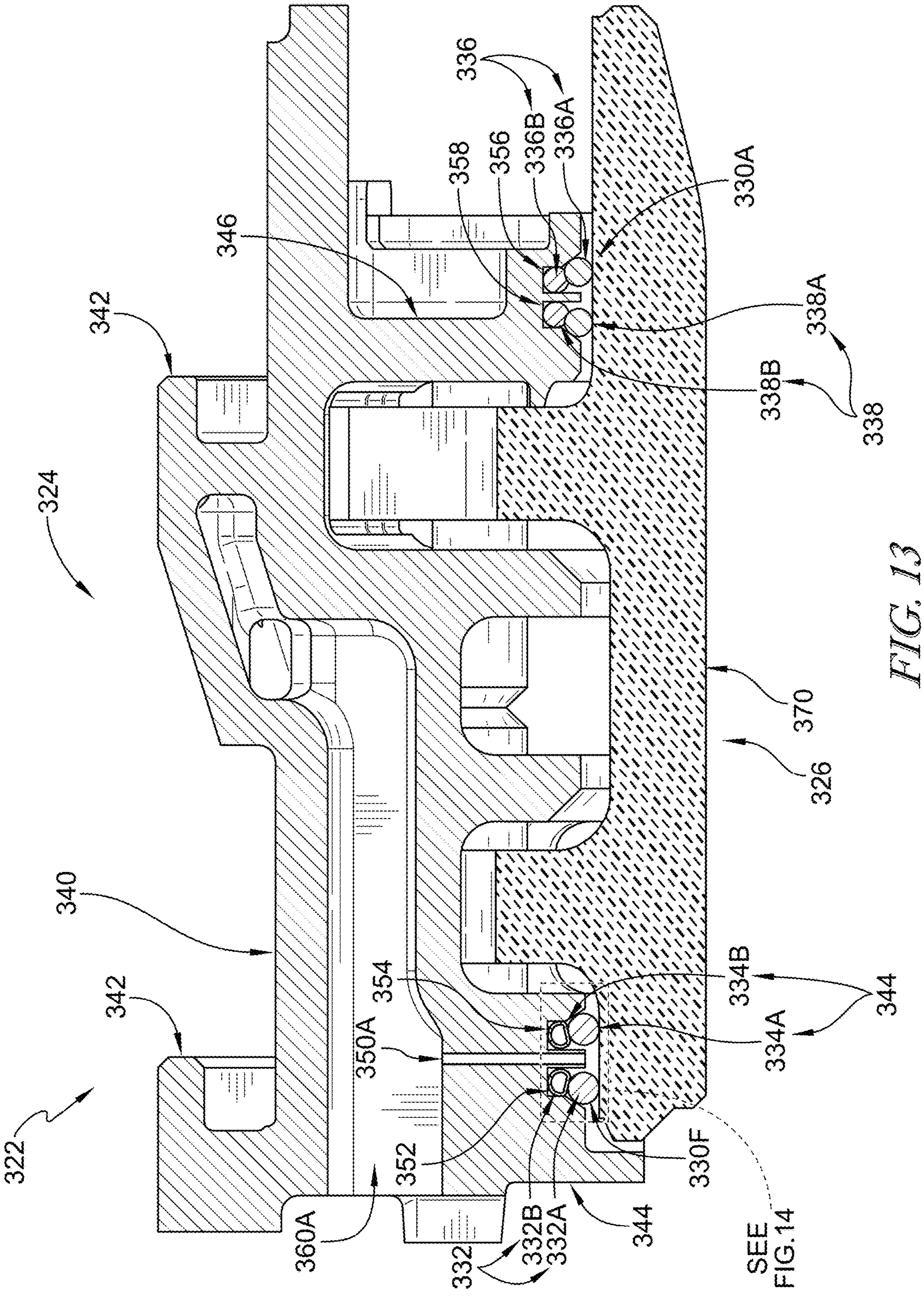
FIG. 13 is a cross-section view of the turbine shroud assembly of FIG. 12 showing the carrier segment includes a forward support wall and an aft support wall spaced apart axially from the forward support wall, and further showing the forward support wall is formed to define a first channel that receives a first seal included in the forward seal assembly, a second channel spaced apart axially from the first channel that receives a second seal included in the forward seal assembly, and a buffer air passageway configured to discharge buffer air axially between the two channels.
Figure 14:
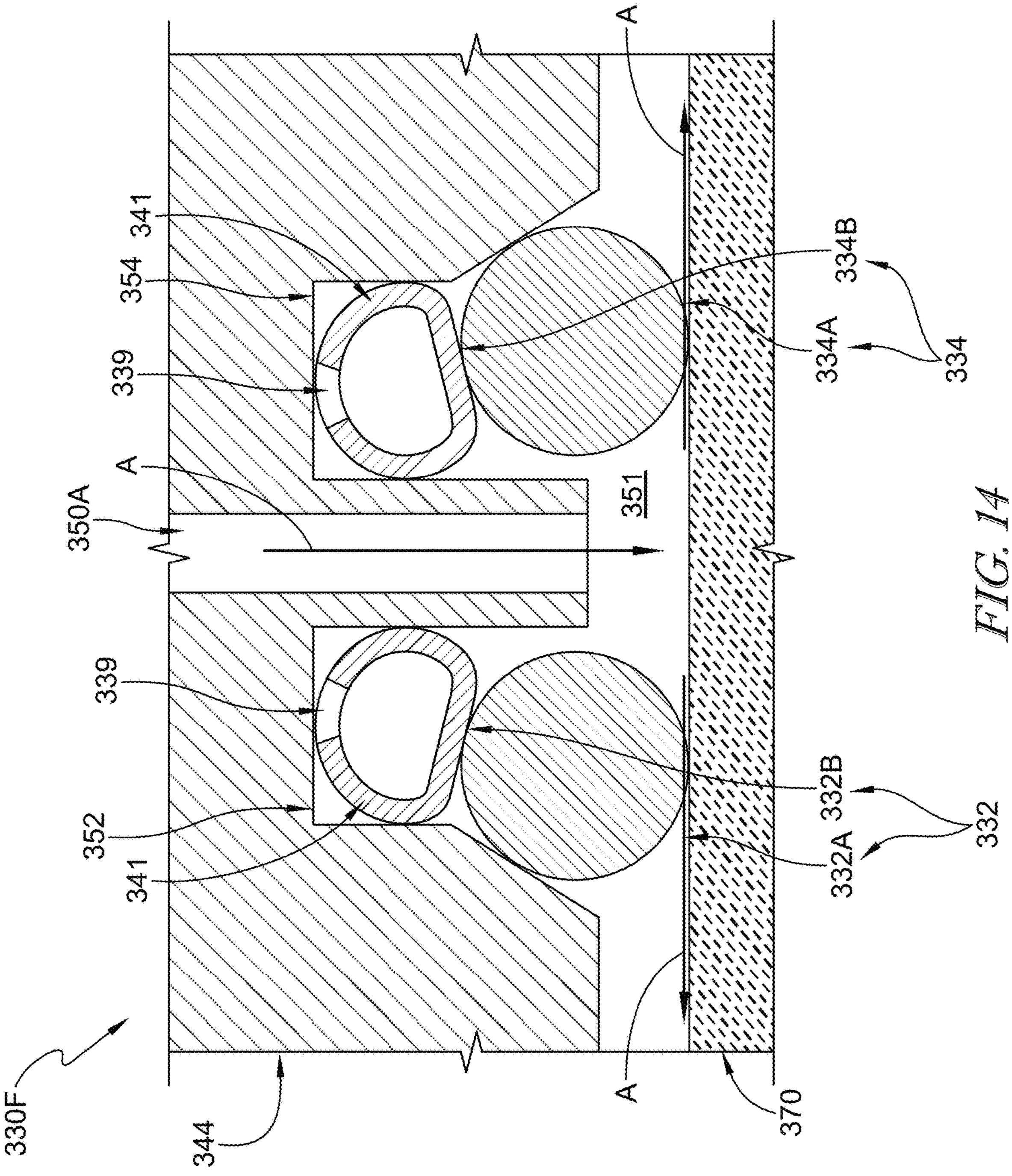
FIG. 14 is a detail view of FIG. 13 showing the forward seal assembly—also referred to as the buffer air seal assembly-includes the first seal arranged in the first channel and the second seal arranged in the second channel so that buffer air is discharged axially between the two seals, and further showing each seal includes a first seal member and a second seal member arranged radially outward of the first seal member and the second seal member is a hollow tube.
Figure 15:
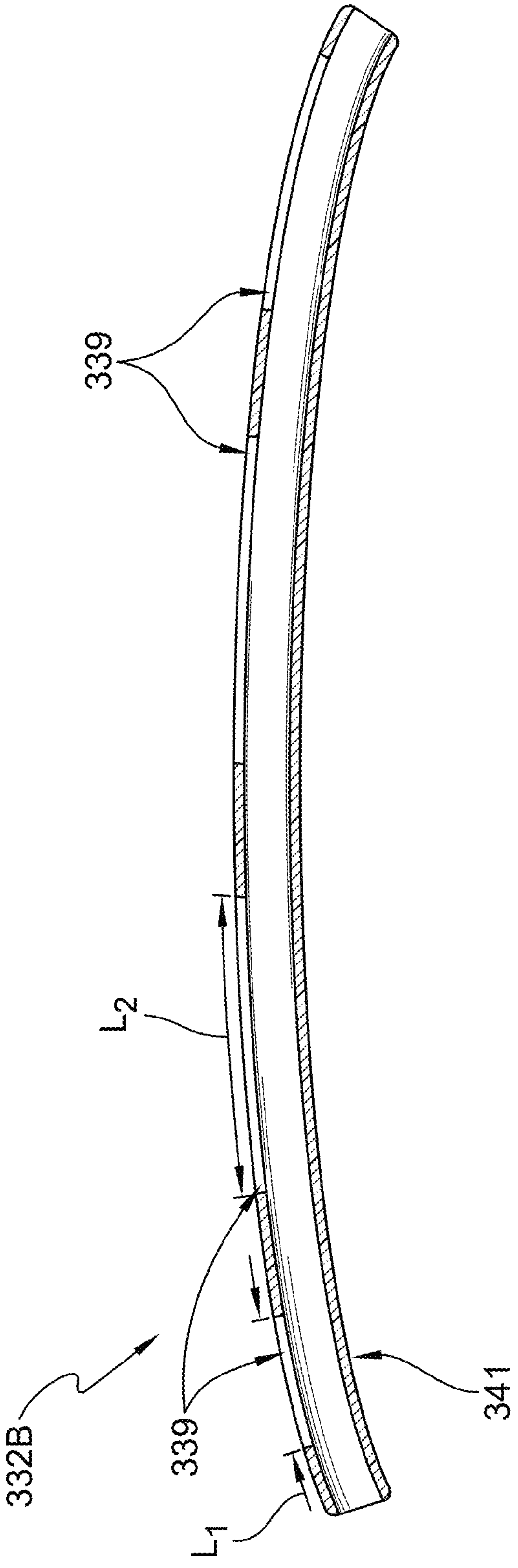
FIG. 15 is a cross-section view of one of the second seal members included in the forward seal assembly of FIG. 14 showing the second seal member is a hollow tube formed to include notches spaced apart circumferentially that each extend through a wall of the hollow tube.

In the illustrative embodiment, the second seal member 332B, 334B of the first and second seals 332, 334 is a hollow tube of metallic material as shown in FIGS. 12-15. The hollow tube is formed to include at least one notch 339 that extends through a wall 341 of the hollow tube 339 as shown in FIGS. 12, 14, and 15. The notch 339 may also extend circumferentially at least partway relative to the axis 11 as shown in FIG. 15.

In the illustrative embodiment, only the second seal members 332B, 334B of the first and second seals 332, 334 are hollow tubes. In some embodiments, some or all of the second seal members 332B, 334B, 336B, 338B of the seals 332, 334, 336, 338 may be hollow tubes.

In the illustrative embodiment, the hollow tube is formed to include a plurality of notches 339 as shown in FIGS. 12, 14, and 15. The notches 339 are spaced apart circumferentially along the circumferential length of the second seal member 332B, 334B as shown in FIG. 15.

In some embodiments, the notches 339 are the same size/circumferential length as shown in FIG. 12. The number of notches 339 and/or the size/length of the notches 339 may be varied to control how much the second seal members 332B, 334B, 336B, 338B are crushed or compressed when compressed between the carrier segment 324 and the first seal member 332A, 334A, 336A, 338A. For example, one notch 339 may have a first circumferential length $L_1$ and a second notch 339 may have a second circumferential length L2 that is greater than the first length $L_1$ as shown in FIG. 15.

The carrier segment 324 includes an outer wall 340, a pair of hangers 342, a forward support wall 344, and an aft support wall 346 as shown in FIGS. 12-14. The outer wall 340 extends circumferentially at least partway about the axis 11. The forward support wall 344 extends radially inward from the outer wall 340 axially forward of the first attachment flange 374 of the attachment feature 372 included on the blade track segment 326 and the aft support wall 46 extends radially inward from the outer wall 340 axially aft of the second attachment flange 376 of the attachment feature 372 included on the blade track segment 326.

The forward and aft support walls 344, 346 of the carrier segment 324 each include channels 352, 354, 356, 358 as shown in FIGS. 13 and 14. The forward support wall 346 is formed to include the first channel 352, the second channel 354, and the buffer air passageway 350A. The second channel 354 is spaced apart axially from the first channel 352 to define a first partition wall 353 therebetween. The aft support wall 346 is formed to include the third channel 356 and the fourth channel 358. The fourth channel 358 is spaced apart axially from the third channel 356 to define a second partition wall 355 therebetween. The buffer air passageway 350A extends radially into the forward support wall 344 through the first partition wall 353 defined axially between the first channel 352 and the second channel 354.

The buffer air passageway 350A, 50B, 50C extends from one of the outer cavities 360A, 360B, 360C formed in the outer wall 340 of the carrier segment 324 as shown in FIGS. 9 and 10. The buffer air flows from one of the outer cavities 360A, 360B, 360C to the buffer air passageways 350A. In some embodiments, the forward support wall 344 includes a plurality of buffer air passageways like in FIGS. 1-7.

The different channels 352, 354, 356, 358 have a similar shape as the channels 52, 54, 56, 58 in the embodiments of FIGS. 1-7. As such, the channels 352, 354, 356, 358 are defined by similar surfaces. In some embodiments, the channel 352, 354, 356 358 have a similar shape as the channels 252, 254, 256, 258 in the embodiments of FIGS. 9-11.

A method of assembling and using the turbine shroud segment 322 may include several steps. The method includes arranging the seals 332, 334, 336, 338 in the corresponding channels 352, 354, 356, 358 before arranging the blade track segment 326 adjacent to the carrier segment 324. The method includes arranging the first seal 332 in the first channel 352, arranging the second seal 334 in the second channel 354, arranging the third seal 336 in the third channel 356, and arranging the fourth seal 338 in the fourth channel 358.

The step of arranging the first seal 332 in the first channel 352 includes inserting or arranging the second seal member 332B of the first seal 332 in the first channel 352. Once the second seal member 332B is arranged in the first channel 352, the first seal member 332A of the first seal 332 is inserted or arranged in the first channel 352 so that second seal member 332B is located radially outward of the first seal member 332A. This process may be repeated for the other seals 334, 336, 338.

Before arranging the second seal members 332B, 334B, 336B, 338B in the respective channels 352, 354, 356, 358, the method may further include forming a notch 339 or notches 339 in the second seal members 332B, 334B, 336B, 338B. In the illustrative embodiment, only the second seal members 332B, 334B of the first and second seals 332, 334 are formed to include notches 339. In some embodiments, notches 339 may be formed in the second seal members 336B, 338B of the third and fourth seals 336, 338.

Once all the seals 332, 334, 336, 338 are arranged in the corresponding channels 352, 354, 356, 358, the blade track segment 326 is arranged adjacent to the carrier segment 324 so that the seals 332, 334, 336, 338 of the forward and aft seal assemblies 330F, 330A are radially between the carrier segment 324 and the shroud wall 370 of the blade track segment 326 to block gases in the gas path from flowing between the carrier segment 324 and the blade track segment 326. The method further includes compressing the second seal members 332B, 334B, 336B, 338B of each seal 332, 334, 336, 338 between the carrier segment 324 and the first seal member 332A, 334A, 336A, 338A to urge the first seal member 332A, 334A, 336A, 338A into engagement with the shroud wall 370 of the blade track segment 326. The method further includes discharging a flow of buffer air through the at least one buffer air passageway 350A.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly adapted for use with a gas turbine engine, the turbine shroud assembly comprising a carrier segment arranged circumferentially at least partway around an axis, the carrier segment including an outer wall, a first support wall that extends radially inward from the outer wall, and a second support wall that extends radially inward from the outer wall at a location spaced apart axially from the first support wall to define an attachment-receiving space, and wherein the first support wall is formed to include a radially-inwardly opening first channel that extends circumferentially relative to the axis, a radially-inwardly opening second channel spaced apart axially from the first channel that extends circumferentially relative to the axis, and at least one buffer air passageway that extends radially into the first support wall axially between the first channel and the second channel and configured to discharge buffer air radially inward away from the carrier segment, a blade track segment arranged circumferentially at least partway around the axis to define a portion of a gas path of the gas turbine engine, the blade track segment having a shroud wall that extends circumferentially partway around the axis and an attachment feature that extends radially outward from the shroud wall into the attachment-receiving space formed in the carrier segment, and a buffer air seal assembly located radially between the carrier segment and the shroud wall of the blade track segment to block gases from flowing between the carrier segment and the blade track segment into the attachment-receiving space of the carrier segment, the buffer air seal assembly including a first seal arranged in the first channel and engaged with the shroud wall and a second seal arranged in the second channel and engaged with the shroud wall, wherein the first and second channel cooperate to define a partition wall therebetween that extends circumferentially relative to the axis, the partition wall having a terminal end that faces the blade track segment, and wherein the at least one buffer air passageway extends radially through the partition wall, wherein the first and second seals each include a first seal member that extends circumferentially at least partway about the axis and a second seal member that extends circumferentially at least partway about the axis, the second seal member arranged entirely radially outward of the terminal end of the partition wall and radially outward of the first seal member so that the second seal member is positioned out of a direct flow path of the buffer air discharged by the at least one buffer air passageway to reduce a risk of oxidation of the second seal member, and wherein the second seal member is compressed between the carrier segment and the first seal member and urges the first seal member into engagement with the shroud wall of the blade track segment.

2. The turbine shroud assembly of claim 1, wherein the second support wall is formed to include a radially-inwardly opening third channel that extends circumferentially relative to the axis, and the turbine shroud assembly further comprises a third seal arranged in the third channel.

3. The turbine shroud assembly of claim 2, wherein the third seal includes a first seal member that extends circumferentially at least partway about the axis and a second seal member that extends circumferentially at least partway about the axis, the second seal member arranged radially outward of the first seal member.

4. The turbine shroud assembly of claim 3, wherein the second support wall is further formed to include a radially-inwardly opening fourth channel spaced apart axially from the radially-inwardly opening third channel that extends circumferentially relative to the axis, and the turbine shroud assembly further comprises a fourth seal arranged in the fourth channel, and wherein the fourth seal includes a first seal member that extends circumferentially at least partway about the axis and a second seal member that extends circumferentially at least partway about the axis, the second seal member arranged radially outward of the first seal member.

5. The turbine shroud assembly of claim 1, wherein the first channel and the second channel are each defined by a partition-wall surface of the partition wall, an end surface that extends axially from the partition-wall surface, and a support-wall surface that extends from the end surface towards the blade track segment, and wherein the support-wall surface has a radially-extending section that extends radially-inward from the end surface and an angled section that extends radially-inward and axially from the radially-extending section of the support-wall surface, and wherein the second seal member of the first seal and the second seal engages the radially-extending section of the support-wall surface and the partition-wall surface of the partition wall.

6. The turbine shroud assembly of claim 5, wherein the first seal member of the first seal and the second seal engages the angled section of the support-wall surface.

7. The turbine shroud assembly of claim 6, wherein the angled section of the support-wall surface included in the first channel extends radially-inward and axially forward from the radially-extending section, and wherein the angled section of the support-wall surface included in the second channel extends radially-inward and axially aft from the radially-extending section.

8. The turbine shroud assembly of claim 1, wherein the second seal member of the first seal and the second seal does not engage the blade track segment.

9. The turbine shroud assembly of claim 1, wherein the second seal member comprises a braid of metallic material.

10. The turbine shroud assembly of claim 9, wherein the second seal member has a rectangular cross-section when viewed circumferentially relative to the axis.

11. The turbine shroud assembly of claim 1, wherein the second seal member is a hollow tube of metallic material.

12. The turbine shroud assembly of claim 11, wherein the hollow tube is formed to include at least one notch that extends through a wall of the hollow tube.

13. The turbine shroud assembly of claim 1, wherein the first seal member comprises a single strand of solid metallic material.

14. The turbine shroud assembly of claim 1, wherein the first channel is defined by a first partition-wall surface of the partition wall, a first end surface that extends axially from the first partition-wall surface, and a first support-wall surface that extends from the first end surface towards the blade track segment, and wherein the first support-wall surface has a radially-extending section that extends radially-inward from the first end surface and an angled section that extends radially-inward and axially forward from the radially-extending section of the first support-wall surface.

15. The turbine shroud assembly of claim 14, wherein the second channel is defined by a second partition-wall surface of the partition wall, a second end surface that extends axially from the second partition-wall surface, and a second support-wall surface that extends from the second end surface towards the blade track segment, and wherein the second support-wall surface has a radially-extending section that extends radially-inward from the second end surface and an angled section that extends radially-inward and axially aft from the radially-extending section of the second support-wall surface.

16. A turbine shroud assembly adapted for use with a gas turbine engine, the turbine shroud assembly comprising a carrier segment arranged circumferentially at least partway around an axis, the carrier segment including an outer wall, a first support wall that extends radially inward from the outer wall, and a second support wall that extends radially inward from the outer wall at a location spaced apart axially from the first support wall to define an attachment-receiving space, and wherein the first support wall is formed to include a radially-inwardly opening first channel that extends circumferentially relative to the axis, a radially-inwardly opening second channel spaced apart axially from the first channel that extends circumferentially relative to the axis, and at least one buffer air passageway that extends radially into the first support wall axially between the first channel and the second channel and configured to discharge buffer air radially inward away from the carrier segment, a blade track segment arranged circumferentially at least partway around the axis to define a portion of a gas path of the gas turbine engine, the blade track segment having a shroud wall that extends circumferentially partway around the axis and an attachment feature that extends radially outward from the shroud wall into the attachment-receiving space formed in the carrier segment, and a buffer air seal assembly located radially between the carrier segment and the shroud wall of the blade track segment to block gases from flowing between the carrier segment and the blade track segment into the attachment-receiving space of the carrier segment, the buffer air seal assembly including a first seal arranged in the first channel and engaged with the shroud wall and a second seal arranged in the second channel and engaged with the shroud wall, wherein the first and second channel cooperate to define a partition wall therebetween that extends circumferentially relative to the axis, and wherein the at least one buffer air passageway extends radially through the partition wall, wherein the first channel is defined by a first partition-wall surface of the partition wall, a first end surface that extends axially from the first partition-wall surface, and a first support-wall surface that extends from the first end surface towards the blade track segment, and wherein the first support-wall surface has a radially-extending section that extends radially-inward from the first end surface and an angled section that extends radially-inward and axially forward from the radially-extending section of the first support-wall surface, wherein the second channel is defined by a second partition-wall surface of the partition wall, a second end surface that extends axially from the second partition-wall surface, and a second support-wall surface that extends from the second end surface towards the blade track segment, and wherein the second support-wall surface has a radially-extending section that extends radially-inward from the second end surface and an angled section that extends radially-inward and axially aft from the radially-extending section of the second support-wall surface, and wherein the first partition-wall surface of the partition wall has a radially-extending section that extends radially-inward from the first end surface and an angled section that extends radially-inward and axially aft from the radially-extending section of the first partition-wall surface, and wherein the second partition-wall surface of the partition wall has a radially-extending section that extends radially-inward from the second end surface and an angled section that extends radially-inward and axially forward from the radially-extending section of the second partition-wall surface.

17. A method comprising:

providing a carrier segment arranged circumferentially at least partway around an axis, the carrier segment formed to include a radially-inwardly opening first channel that extends circumferentially relative to the axis, a radially-inwardly opening second channel spaced apart axially from the radially-inwardly opening first channel that extends circumferentially relative to the axis, and at least one buffer air passageway that extends radially into the carrier segment axially between the first channel and the second channel, wherein the first and second channel cooperate to define a partition wall therebetween that extends circumferentially relative to the axis, the partition wall having a terminal end that faces the blade track segment, and wherein the at least one buffer air passageway extends radially through the partition wall, providing a blade track segment arranged circumferentially at least partway around the axis, the blade track segment having a shroud wall that extends circumferentially partway around the axis and an attachment feature that extends radially outward from the shroud wall, providing a buffer air seal assembly including a first seal and a second seal, wherein the first and second seals each include a first seal member that extends circumferentially at least partway about the axis and a second seal member that extends circumferentially at least partway about the axis, arranging the first seal of the buffer air seal assembly in the first channel formed in the carrier segment, wherein arranging the first seal in the first channel includes arranging the second seal member in the first channel before arranging the first seal member in the first channel so that the second seal member is located entirely radially outward of the terminal end of the partition wall, arranging the second seal of the buffer air seal assembly in the second channel formed in the carrier segment, wherein arranging the second seal in the second channel includes arranging the second seal member in the second channel before arranging the first seal member in the second channel so that the second seal member is located entirely radially outward of the terminal end of the partition wall, arranging the blade track segment adjacent to the carrier segment so that the buffer air seal assembly is radially between the carrier segment and the shroud wall of the blade track segment to block gases from flowing between the carrier segment and the blade track segment, compressing the second seal member of the first and second seals between the carrier segment and the first seal member to urge the first seal member into engagement with the shroud wall of the blade track segment, and discharging a flow of buffer air through the at least one buffer air passageway into the first channel.

18. The method of claim 17, further comprising providing at least one retainer and inserting the at least one retainer axially into the carrier segment and through the attachment feature of the blade track segment to couple the blade track segment to the carrier segment.

19. The method of claim 17, wherein the first channel and the second channel are each defined by a partition-wall surface of the partition wall, an end surface that extends axially from the partition-wall surface, and a support-wall surface that extends from the end surface towards the blade track segment, and wherein the support-wall surface has a radially-extending section that extends radially-inward from the end surface and an angled section that extends radially-inward and axially from the radially-extending section of the support-wall surface, and wherein the second seal member of the first seal and the second seal engages the radially-extending section of the support-wall surface and the partition-wall surface of the partition wall.

20. The method of claim 19, wherein the first seal member of the first seal and the second seal engages the angled section of the support-wall surface.

* * * * *